(12) United States Patent
Lv et al.

(10) Patent No.: US 11,438,925 B2
(45) Date of Patent: Sep. 6, 2022

(54) TECHNIQUES OF IMPROVING EDCA MECHANISM IN SPATIAL REUSE

(71) Applicant: ZTE Corporation, Guangdong (CN)

(72) Inventors: Kaiying Lv, Guangdong (CN); Bo Sun, Guangdong (CN); Yonggang Fang, Guangdong (CN)

(73) Assignee: ZTE Corporation, Guangdong (CN)

( * ) Notice: Subject to any disclaimer, the term of this patent is extended or adjusted under 35 U.S.C. 154(b) by 154 days.

(21) Appl. No.: 16/370,865

(22) Filed: Mar. 29, 2019

(65) Prior Publication Data

US 2019/0230703 A1 Jul. 25, 2019

Related U.S. Application Data

(63) Continuation of application No. PCT/CN2017/105053, filed on Sep. 30, 2017.

(30) Foreign Application Priority Data

Sep. 30, 2016 (WO) ................ PCT/CN2016/101170
Oct. 26, 2016 (WO) ................ PCT/CN2016/103378
Nov. 3, 2016 (WO) ................ PCT/CN2016/000605

(51) Int. Cl.
*H04W 74/02* (2009.01)
*H04W 52/24* (2009.01)
(Continued)

(52) U.S. Cl.
CPC .......... *H04W 74/02* (2013.01); *H04B 17/318* (2015.01); *H04W 52/245* (2013.01);
(Continued)

(58) Field of Classification Search
None
See application file for complete search history.

(56) References Cited

U.S. PATENT DOCUMENTS 10,045,349 B2 * 8/2018 Atefi ................... H04W 72/046
10,172,137 B1 * 1/2019 Hedayat ............ H04W 72/0473
(Continued)

FOREIGN PATENT DOCUMENTS

| CN | 105191381 A | 12/2015 |
| WO | 2013190168 | 12/2013 |

OTHER PUBLICATIONS

Extended European Search Report for European Patent Application No. 17855043.0, dated Aug. 29, 2019 (8 pages).
(Continued)

*Primary Examiner* — Mariela Vidal Carpio
(74) *Attorney, Agent, or Firm* — Perkins Coie LLP

(57) ABSTRACT

A transmitting wireless device provides channel spatial reuse information to a receiving wireless device for the receiving wireless device to make a determination of how to contend the medium for spatial reuse transmission, when to transmit and what transmissions parameters to use for the transmission in the spatial reuse. A timer is designated to track the remaining time for inter-ESS and/or intra-ESS spatial reuse. The spatial reuse information may include fields indicative of color code identifying BSS, transmission power used, signal to noise ratio headroom available and so on. With the spatial reuse information, the wireless device can calculate the target transmit power for initiating spatial reuse transmission without interrupting the on-going transmission, perform EDCA in spatial reuse condition to assess the channel status for contending the medium over the on-going transmission(s), tracking the spatial reuse duration and initiate a new spatial reuse transmission over the on-going transmission without interruption.

9 Claims, 12 Drawing Sheets

(51) Int. Cl.
*H04B 17/318* (2015.01)
*H04W 74/08* (2009.01)
*H04W 16/28* (2009.01)
*H04W 72/04* (2009.01)
*H04W 84/12* (2009.01)

(52) U.S. Cl.
CPC ..... *H04W 52/246* (2013.01); *H04W 74/0808* (2013.01); *H04W 16/28* (2013.01); *H04W 72/046* (2013.01); *H04W 84/12* (2013.01)

(56) References Cited

U.S. PATENT DOCUMENTS

| | | | | |
|---|---|---|---|---|
| 10,251,065 B1* | 4/2019 | Jiang | | H04W 16/02 |
| 10,257,859 B1* | 4/2019 | Chu | | H04W 74/0808 |
| 10,306,672 B2* | 5/2019 | Zhu | | H04W 74/002 |
| 2015/0131641 A1* | 5/2015 | Ong | | H04W 52/242 |
| | | | | 370/338 |
| 2015/0358904 A1* | 12/2015 | Kwon | | H04W 24/08 |
| | | | | 370/252 |
| 2016/0066257 A1* | 3/2016 | Liu | | H04W 74/0808 |
| | | | | 370/329 |
| 2016/0174079 A1 | 6/2016 | Wang et al. | | |
| 2016/0198358 A1* | 7/2016 | Rong | | H04W 72/1268 |
| | | | | 370/235 |
| 2016/0227489 A1* | 8/2016 | Oteri | | H04W 52/12 |
| 2016/0262054 A1 | 9/2016 | Singh et al. | | |
| 2017/0041798 A1* | 2/2017 | Li | | H04W 74/0816 |
| 2017/0041952 A1* | 2/2017 | Kim | | H04B 17/318 |
| 2017/0105217 A1* | 4/2017 | Kwon | | H04W 52/244 |
| 2017/0255659 A1* | 9/2017 | Cariou | | H04B 7/0413 |
| 2017/0289987 A1* | 10/2017 | Seok | | H04W 74/0808 |
| 2017/0311166 A1* | 10/2017 | Li | | H04W 16/02 |
| 2018/0014327 A1* | 1/2018 | Park | | H04L 69/323 |
| 2018/0084554 A1* | 3/2018 | Chu | | H04L 5/0007 |
| 2018/0235002 A1* | 8/2018 | Son | | H04W 28/06 |

OTHER PUBLICATIONS

International Search Report and Written Opinion for International Patent Application No. PCT/CN2017/105053, dated Dec. 28, 2017 (7 pages).
Oni, Phillip B. et al., AP Association Optimization and CCA threshold Adjustment in Dense WLANs, Globecom Workshops, 2015 IEEE, Dec. 10, 2015.
Technical Specification Group Radio Access Network; Study on Licensed-Assisted Access to Unlicensed Spectrum, 3GPP TT 36.889 VJ 3.0.0, Jun. 30, 2015.
Chakraborty, Sandip et al., Performance Optimization in Single Channel Directional Multi-Interface IEEE 802.IIs EDCA using Beam Prioritization, IEEE ICC 2012—Wireless Networks Symposium, Nov. 29, 2012.
State Intellectual Property Office, China PRC, First Office Action for Chinese Application No. 201780073815.4, with English translation, dated Jan. 21, 2020.
European Patent Office, Examination Report for European Application No. 17855043.0, dated Apr. 15, 2020.

* cited by examiner

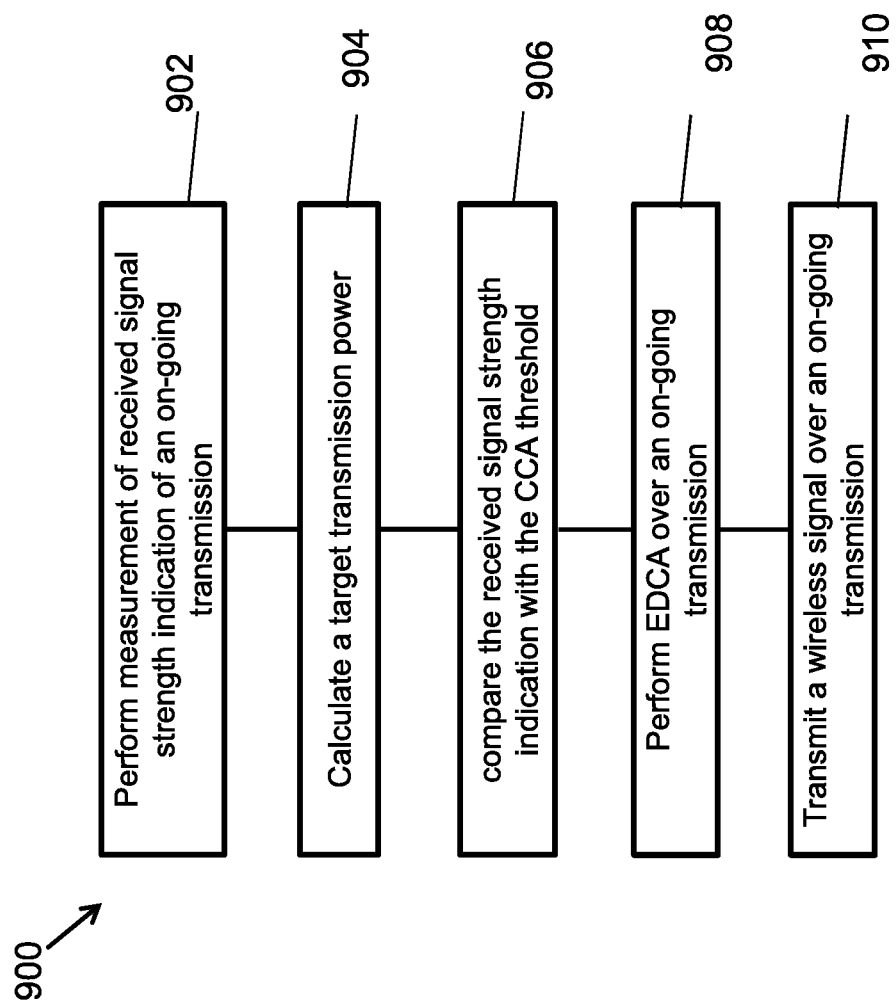

ional transmission frame to the spatial reuse transmission initiator

TECHNIQUES OF IMPROVING EDCA MECHANISM IN SPATIAL REUSE

CROSS REFERENCE TO RELATED APPLICATIONS

This patent document claims the benefit of priority under 35 U.S.C. § 119(a) and the Paris Convention of International Patent Application No. PCT/CN2016/101170, filed on Sep. 30, 2016, International Patent Application No. PCT/CN2016/103378, filed on Oct. 26, 2016, and International Patent Application No. PCT/CN2016/000605, filed on Nov. 3, 2016. The entire contents of the before-mentioned patent applications are incorporated by reference as part of the disclosure of this application.

BACKGROUND

This patent document relates to wireless communications.

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in a different frequency channel via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies for, among other things, using an enhanced EDCA (enhanced distributed channel access) mechanism to contend the medium for transmission over the on-going transmission(s) in the way of sharing radio environment via spatial reuse.

In one example aspect, a method of wireless communication is disclosed. The method includes indicating, by a wireless communication device, whether the spatial reuse is permitted over the on-going transmission(s).

In another example aspect, the method of wireless communication is disclosed. The method includes performing the spatial reuse EDCA mechanism to contend the medium for the transmission over the on-going communications. The spatial reuse EDCA mechanism shares the same backoff counters with legacy EDCA mechanism, and allows to smoothly switch between legacy EDCA and spatial reuse EDCA when the spatial reuse condition is changed. A spatial reuse duration timer is designated for tracking the spatial use period and triggering the EDCA mechanism. In the intra-ESS and inter-ESS spatial reuse, a separate spatial reuse duration timer corresponding to the intra-ESS and inter-ESS is used to track the inter-ESS and intra-ESS spatial reuse time independently.

In another example aspect, an apparatus for wireless communication is disclosed. The apparatus includes a memory that stores executable instructions, and a processor that reads the executable instructions from the memory to control one or more modules of the wireless communication apparatus to perform interference measurement of a wireless transmission medium, and estimate the target wireless transmission power for initiating a new transmission over on-going transmission(s) without interrupting the current communication(s). The information used to calculate the target transmission power includes one or both of (a) a transmit power used for the current wireless transmission, and (b) a headroom of Signal to Interference and Noise Ratio (SINR) left in the current wireless transmission according the interference measurement. Various examples are given with respect to Eq. (1) to Eq. (4).

In yet another example aspect, a method of wireless communication is disclosed. The method includes the enhanced CCA mechanism for spatial reuse sensing, prior to performing a transmission, a medium for received signal strength, performing, if the sensed received signal strength is below the enhanced CCA threshold at the intended transmit power for spatial reuse or energy detection threshold if the signal cannot be identified, transmission, receiving, if the sensed received signal strength is above the enhanced CCA threshold at the intended transmit power of spatial reuse or energy detection threshold if the signal cannot be identified, a PHY transmission, attempting to decode the PHY transmission, extracting, when the attempt to decode the PHY transmission is successful, channel assessment information from the PHY transmission, and adjusting, based on the enhanced channel assessment information, a value of the threshold for future use.

In yet another example aspect, a method of wireless communication is disclosed. The method includes determination of transmission power used in initiating a spatial reuse transmission without interrupting on-going transmission(s). The transmit power could be based on the latest RSSI measurement in the time slot which triggers the backoff counter to be 0, or the average target transmission power among multiple measurement during the spatial reuse backoff period, or the minimum target transmit power among multiple measurements during the spatial reuse backoff period.

In yet another example aspect, a method of wireless communication is disclosed. The method includes carrying a spatial reuse indication in the transmission frame to indicate whether the current transmission is a spatial transmission. The spatial reuse indication should be set to a pre-defined value when the current transmission is a spatial reuse transmission.

In yet another example aspect, a method of wireless communication is disclosed. The method includes the determination of spatial reuse transmission response rule for non-spatial reuse capable STAs or spatial reuse capable STAs. If the responder of the spatial reuse transmission is a non-spatial reuse capable STA, then the spatial reuse transmission initiator may initiate an RTS/CTS frame exchange before the spatial reuse data transmission or set the acknowledgement policy to delayed BA, or no ACK. If the responder of the spatial reuse transmission is a spatial reuse capable STA, then the spatial reuse transmission initiator carries and sets an SR-Indication in the spatial reuse transmission to require the spatial reuse transmission responder to perform the virtual carrier sensing before responding to the spatial reuse transmission, or sets the acknowledgement policy to the delayed BA, or no ACK to the spatial reuse transmission, or initiates an RTS/CTS frame exchange before the spatial reuse data transmission. Furthermore, the spatial reuse capable receiver could examine its SR status and respond an RTS with an CTS by adjusting the TX power conformant with the SRP value or the corresponding OBSS-PD level if its SR status is active. The spatial reuse capable receiver could examine its SR status and make a BA/Ack transmission decision by adjusting the TX power conformant with the corresponding OBSS-PD level or SRP value if its SR status is active. The spatial reuse capable receiver performs the virtual carrier sensing before responding to the spatial reuse transmission when receiving a transmission with an SR-Indication being set and adjusts the TX power conformant with the corresponding OBSS-PD level or SRP value if its SR status is active.

In yet another example aspect, a method of wireless communication is disclosed. The method includes disabling a new SR transmission when the transmission with the spatial reuse indication being set is received by the third party spatial reuse capable stations.

In yet another example of aspect, a method of wireless communication is disclosed. The method includes the determination of adjustable spatial reuse CCA threshold (clear channel assessment threshold) for inter-ESS and intra-ESS separately, and target transmit power for initiating the corresponding ESS spatial reuse transmission at different inter-ESS with intra-ESS scenario.

In yet another example aspect, the above described methods may be implemented by a wireless communication apparatus that includes a processor.

In yet another example aspect, the above described methods may be embodied into processor-executable code and stored on a computer-readable program product.

Details of the above aspects and their implementations are set forth in the accompanying drawings, the description and the claims.

BRIEF DESCRIPTION OF THE DRAWINGS

FIG. 2 shows an example of OBSS deployment scenario in IEEE 802.11, which may apply for spatial reuse transmissions.

FIG. 3 shows examples of spatial reuse transmissions using the disclosed spatial reuse EDCA mechanism for contending the medium in time sequences.

FIG. 9 is a flowchart of an example of a method of wireless communication.

DETAILED DESCRIPTION

Figure 1:
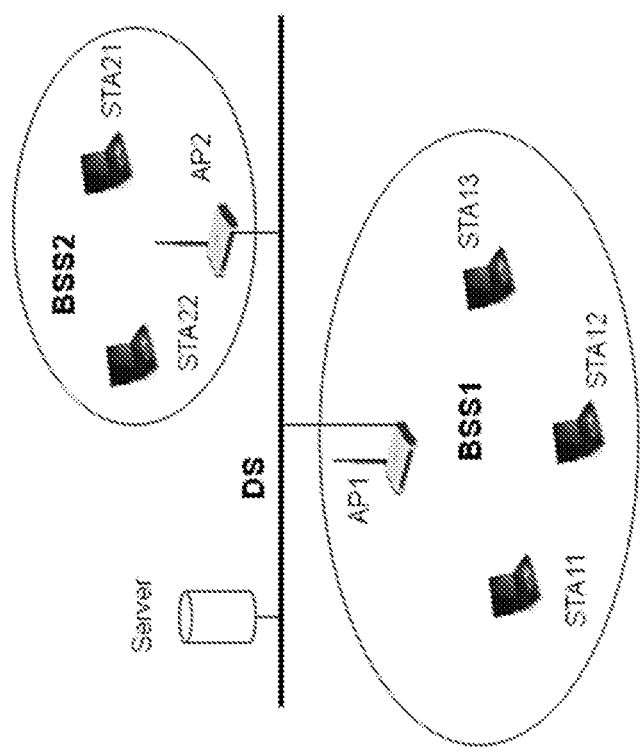
FIG. 1 shows an example of infrastructure BSS in a wireless communication system.

This document describes techniques, mechanisms, devices, and systems of improving EDCA mechanism for contending the medium in special reuse over unlicensed band through enhanced CCA threshold adjustment, transmit power optimization, and MCS rate adaptation to channel condition in an overlapping BSS (OBSS) in contention based wireless communications.

In one aspect, a mechanism is provided for the on-going transmission station to determine whether a spatial reuse with the existing communication is permitted or not. If the station of on-going transmission(s) indicates the spatial reuse over the on-going transmission is permitted, the surrounding stations may use the spatial reuse EDCA mechanism to contend the medium for the spatial reuse transmissions. Otherwise, the spatial reuse transmission over the on-going transmission is prohibited.

In one aspect, a method is provided for tracking the time for spatial reuse duration with the on-going transmission. When the spatial reuse duration timer(s) does not expire, the station may use spatial reuse EDCA mechanism to contend to medium for spatial reuse transmission. If the spatial reuse duration timer(s) expires, the station switches back to legacy EDCA mechanism to contend the medium.

In one aspect, a method is provided for sharing the backoff counters between legacy EDCA mechanism and spatial reuse EDCA mechanism(s) so that different mechanisms can be smoothly switched and continues performing carrier sensing at different conditions.

In one aspect, a method is provided to deliver spatial reuse control information via broadcast beacon or probe response frame. The AP controls the spatial reuse transmission via broadcasting the spatial reuse parameters (such as OBSS-PDmax and OBSS-PDmin) carried in the Information Element of beacon or probe response frame. This information is to control the STA's initiating spatial reuse transmission procedure. When the spatial reuse capable STA receives OBSS-PD parameters, it should use it as OBSS CCA threshold in the spatial reuse channel contention. The OBSS-PD is an adjustable CCA threshold based on the transmit power. When the STA calculates and determines the target transmit power for a new spatial reuse transmission which is different from the reference transmit power, the relative CCA threshold could be adjusted accordingly.

In one aspect, a fast delivery method is provided for stations to include the spatial reuse information (SRP) in the HE SIG field of PPDU transmission. Therefore the spatial reuse information can be used by surrounding spatial reuse capable stations to calculate the path loss and interference level, and determine the target transmission power for initiating a new transmission without interrupting the on-going transmission(s).

In another aspect, a method is provided for the spatial reuse station to adjust the spatial reuse CCA threshold according to the target transmission power level for initiating a new transmission without interrupting the on-going transmission(s) during the spatial reuse period if the station can detect the preamble or identify IEEE802.11 based symbols of PPDU, or otherwise use energy detection threshold to assess the channel occupancy.

In another aspect, a method is provided for the spatial reuse station to perform spatial reuse EDCA and decrease the backoff counter when assessing the channel as idle for a slot time according to the RSSI measurement of received PPDU and the appropriate spatial reuse CCA threshold, or suspend the backoff counter when assessing the channel as busy for a slot time.

In yet another aspect, a method is provided for spatial reuse initiating station to choose appropriate transmit power that does not interrupt the on-going transmission and right MCS rate adaptive to the receiving channel condition of spatial reuse receiving station during the spatial reuse period. In some embodiments, through MCS adaptation, the spatial reuse transmission over the same channel shared with other on-going transmissions could be successfully demodulated and decoded by the spatial reuse receiving station. If the spatial reuse period is timed out, the station may transmit a frame with full power.

In yet another example aspect, a method of wireless communication is disclosed. The method includes the spatial reuse initiating STA carrying a Spatial Reuse Indication in the HE-SIG-A field of transmission frame to indicate whether the current transmission is a spatial transmission, and setting it to a pre-defined value when the current transmission being a spatial reuse transmission.

In yet another example aspect, a method of wireless communication is disclosed. The method includes the determination of spatial reuse transmission response rule for non-spatial reuse capable STAs or spatial reuse capable STAs. If the responder of the spatial reuse transmission is a non-spatial reuse capable STA, then the spatial reuse transmission initiator may initiate an RTS/CTS frame exchange before the spatial reuse data transmission or set the acknowledgement policy to delayed BA, or no ACK. If the responder of the spatial reuse transmission is a spatial reuse capable STA, then the spatial reuse transmission initiator carries and sets an SR-Indication in the spatial reuse transmission to require the spatial reuse transmission responder to perform the virtual carrier sensing before responding to the spatial reuse transmission.

In yet another example aspect, a method of wireless communication is disclosed. The method includes disabling a new SR transmission when the transmission with the Spatial Reuse Indication being set is received by the third party spatial reuse capable stations.

Section headings are used in the present document only for ease of understanding, and do not in any way limit the scope of the disclosed technology.

In IEEE 802.11, the basic service set (BSS) is the building block of a Wireless Local Area Network (WLAN). Wireless stations (also called stations) associated in the radio coverage area establish a BSS and provide basic service of WLAN.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server through a distribution system (DS). A central station being associated with other stations and dedicated to manage the BSS is referred to an Access Point (AP). A BSS built around an AP is called an infrastructure BSS.

IEEE 802.11 wireless communications support multiple access and provide two types of access control mechanisms for multiple stations to access the medium:

A) Distributed Coordination Function (DCF)
B) Point Coordination Function (PCF).

PCF (or its enhanced version HCCA—hybrid control function coordinated channel access) is a centrally controlled multiple Media Access Control (MAC) mechanism used in IEEE 802.11 based WLANs. PCF typically resides in an AP to coordinate the communication within the BSS. The AP waits for PIFS (PCF interframe space) to contend the medium after the medium is sensed in idle. With higher priority than DCF, AP can contend the medium earlier than other stations and send a CF-Poll frame to the PCF capable stations to schedule its transmissions. If the polled station does not have any frames to send, it transmits null frame to the AP. Otherwise, the polled station will take the transmission opportunity to send its data frames to the AP over the medium.

Because PCF (or HCCA) uses polling mechanism for multiple access control, i.e. it alternatively in time polls all the associated stations to check whether they have data to send, it may encounter channel efficiency issue when there are a large number of associated stations in the deployment cases such as the hotspot of public area or conference room. When the number of associated stations is large, but only a few of them are active (i.e. stations that want to send packets to the network), the PCF polling mechanism is not very efficiency and causes a lot of medium waste.

DCF, on the other hand, relies on the carrier sensing multiple access with collision avoidance (CSMA/CA) mechanism to control the multiple medium accesses. Each station implements a CSMA/CA function. Before access to the wireless medium, the station senses the medium occupancy using CSMA/CA. If the station senses that the medium is busy, the station waits and retries sensing the medium at a later time. If the station senses the medium in idle state, it will wait for some IFS and then enter a time period called the contention window (CW). In order to support multiple stations to access the medium, each station has to backoff a random time before transmitting over the medium so that the access to medium could be evenly distributed.

Clear Channel Assessment (CCA) is a function of PHY that is used to determine the current state of the wireless medium occupancy. CCA mechanism could be categorized as:

A) CCA-Preamble Detection (CCA-PD): The CCA-PD can be performed by the PHY of station via measuring the signal strength of preamble (short training sequence) of an OFDM transmission at a receiving level equal to or greater than the minimum modulation and coding rate sensitivity, called CCA Threshold (CCAT). In some embodiments, the CCAT may be set to:

CCAT=−82 dBm for 20 MHz channel bandwidth, or
CCAT=−79 dBm for 40 MHz channel bandwidth, etc.

A CCA mechanism of a station may report busy when a preamble is detected at or above the CCAT. A CCA mechanism may consider the medium to be busy for the length (duration) of the received frame as indicated in the frame's PLCP Length field.

B) CCA-Mid preamble Detection (CCA-MD): CCA-MD is used to detect the symbols with specific format like 802.11 when the preamble detection is missed. According to OFDM symbol characteristic, CCA-MD detects the accumulated energy of CP in OFDM symbol to identify whether the received signal belongs to an 802.11 frame or not.

C) CCA-Energy Detect (CCA-ED): If the PHY of station misses the detection of preamble or is not able to detect preamble of a valid OFDM transmission, the PHY may perform CCA ED, and claim a medium busy condition when CCA-ED measures the signal strength at level to or greater than, e.g., 20 dB high over the minimum modulation and coding rate sensitivity CCAT (in dBm). CCA-ED could be used for detection on medium sharing with inter-technology (i.e., different MAC-PHY occupying the same spectrum) system.

CCA mechanism is originally designated for single transmission detection. In some embodiments, once a STA senses the RSSI (received signal strength indication) of received signal higher than the CCAT, the medium is assessed as busy, and the station has to continue sensing until the medium becomes idle, and then can transmit a frame.

In a Multi-User Multiple Input and Multiple Output (MU MIMO), multiple transmissions from different users can be performed in spatial reuse manner over the shared medium. The spatial reuse allows two or more transmissions over the same radio channel in the same coverage without interrupting each other. Therefore it requires an enhanced EDCA with adjustable CCAT for spatial reuse carrier sensing.

The spatial reuse transmission can be categorized as:

(A) AP controlled spatial reuse: In the AP controlled spatial reuse, the AP broadcast the spatial reuse control information in the beacon or probe response frame, such as OBSS-PDmin and OBSS-PDmax, etc., to notify the spatial reuse capable stations the spatial reuse parameters for the enhanced EDCA. The spatial reuse capable station shall use those parameters to perform the spatial reuse contention and transmit PPDU in spatial reuse.

(B) Transmitting STA controlled spatial reuse: In this type of spatial reuse transmission, the transmitting STA controls the spatial reuse via including the spatial reuse parameters (SRP) in the HE SIG of PPDU. When the surrounding SR capable STAs receive such SRP information, they shall use them to determine the target transmit power, adjusted CCA threshold, and target MCS for the spatial reuse transmission(s).

The spatial reuse procedure starts with that one station detects the preamble of PPDU from other BSS and may enter the SR state. The SR state consists of following information.

1) SR status: The SR status information indicates active or inactive of spatial reuse over the on-going transmission. The default value of SR status is inactive.

(a) For the AP controlled spatial reuse, when a SR capable STA receives OBSS-PD information in the beacon or probe response frames, the STA shall set the SR status to active when it receives an OBSS PPDU, which means the AP controlled SR transmission is permitted.

(b) For the transmitting STA controlled spatial reuse, if the SR capable STA receives the SRP subfield in HE-SIG-A of PPDU with the indication of SR disallowed, the STA shall set the SR Status to inactive. Otherwise, if the SR capable STA receives the SRP in HE-SIG-A of PPDU with the indication of SR allowed, the STA shall set the SR Status to active.

For either the AP controlled spatial reuse or transmitting STA control spatial reuse, if the third party SR capable STAs receive a SR PPDU with the SR-Indication in HE-SIG-A field being set to 1 (i.e. pre-determined value), the third party SR capable STAs shall set the SR status to inactive to disable a new SR transmission over that on-going transmission.

2) SR duration: When the SR status becomes active; the SR duration timer is enabled and used to count down the remaining time of the detected PPDU transmission or TXOP for SR which depends on the type of spatial reuse.

(a) For the AP controlled SR (i.e. OBSS-PD based SR), the SR duration timer is set to the remaining time of the detected PPDU transmission if the TXOP duration subfield of HE-SIG-A field in detected PPDU transmission is all 1s (which means there is no TXOP information in the HE-SIG-A), or the current TXOP value in the HE-SIG-A field of received PPDU if the TXOP value is not all 1s.

(b) If it is the transmitting station controlled SR, the SR duration timer is set to the remaining time of current PPDU.

Once the SR duration timer expires, the SR capable STA sets the SR status to inactive.

When the station enters the SR state, it uses spatial reuse EDCA (SR-EDCA) to contend the medium with other SR capable STAs. The station determines the transmit power level of PPDU and the MCS rate in the spatial reuse when the backoff counter reaches 0. In this way, it can avoid interrupting the on-going transmission(s) and provide reliable delivery of the PPDU to the destination station in spatial reuse.

Figure 2A:
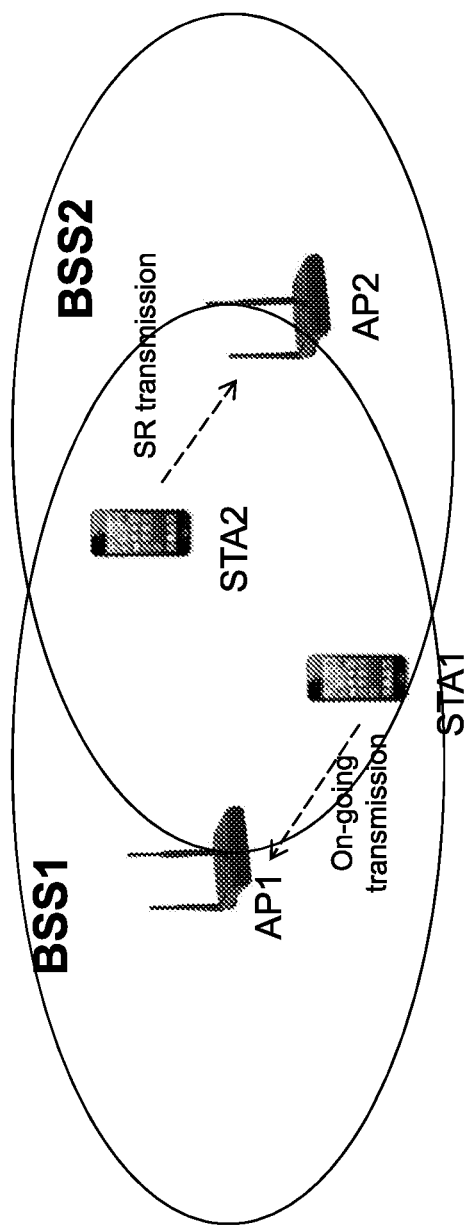
FIG. 2(A) shows an example of single OBSS deployment for spatial reuse.

FIG. 2(A) shows an example of two BSSs that are overlapped each other.

AP1 and STA1 belong to BSS1. AP2 and STA2 belong to BSS2. In the overlapped area of BSS1 and BSS2, STA1 and STA2 can hear the transmissions from both AP1 and AP2. For example, AP1 starts a communication with STA1 via sending a trigger frame. STA1 responds with a Trigger-Based PPDU. In the spatial reuse case, the STA2 which is going to share the medium with the on-going transmission is called the SR initiator and AP2 is called the SR responder. As STA2 is in the overlapped area with BSS1, it can detect the preamble of PPDU and decode the SIG field of PPDU sent from BSS1. Based on the information of Color Code (CC) in the SIG, the STA2 can know whether the PPDU is from BSS1.

If the CC of received PPDU indicates BSS2, the STA2 knows the transmission is from intra BSS and marks the medium as busy and not interfere the on-going transmission in BSS2. If the CC of received PPDU indicates BSS1, i.e. OBSS, the STA2 will further check whether the spatial reuse is allowed if it is the transmitting station controlled spatial reuse, or will perform the enhanced CCA for spatial reuse directly if the AP controlled spatial reuse is supported. If the PPDU carries SRP in HE-SIG-A and it indicates the BSS1 does not allow spatial reuse over its current on-going transmission, the STA2 will not enter the SR state. Instead it will suspend its backoff counter and continue sensing the medium until it becomes idle again. If the SRP indicates the spatial reuse allowed for the transmitting STA controlled SR or the AP controlled spatial reuse is supported, the STA2 shall set the SR status to active and may perform SR transmission using SR-EDCA to further check the radio condition.

If the STA2 performs SR-EDCA in the medium contention and senses the channel idle, the STA2 may initiate the SR transmission over the current on-going transmission, and may include the SR-Indication in the HE-SIG of SR transmission to indicate the new transmission is a SR transmission.

Figure 2B:
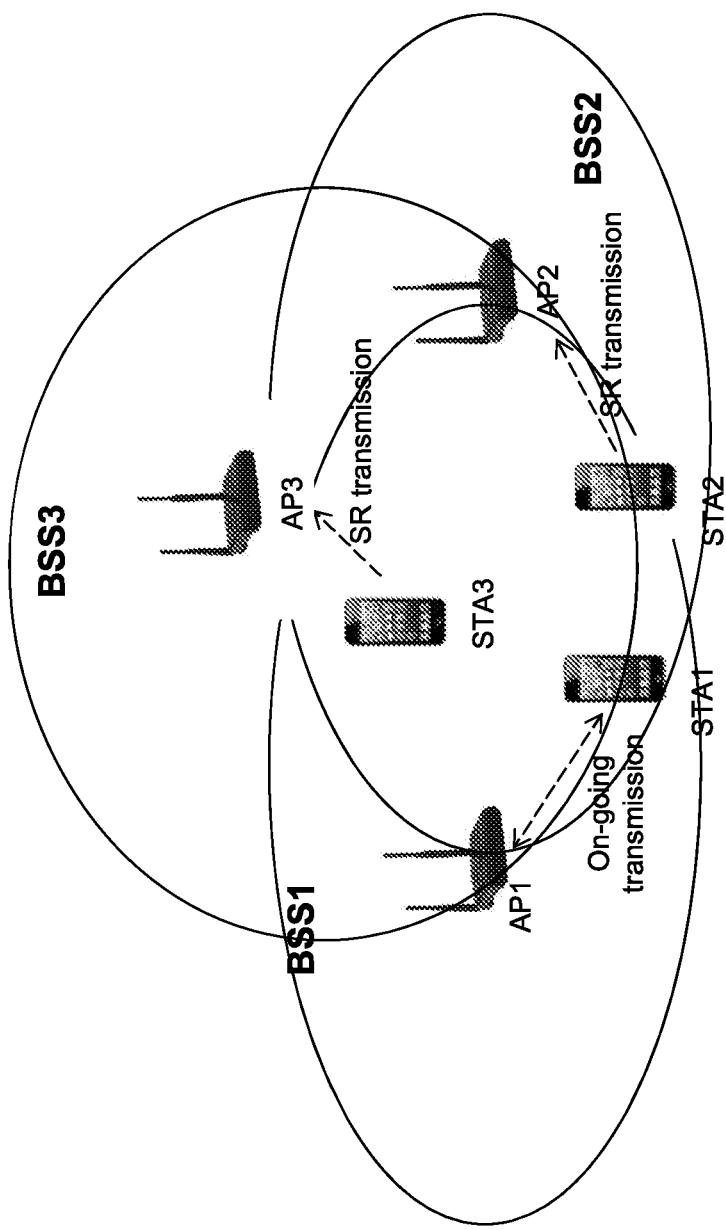
FIG. 2(B) shows an example of multiple OBSS deployment for spatial reuse.

FIG. 2(B) shows an example of three BSSs overlapped each other. AP1 and STA1 belong to BSS1. AP2 and STA2 belong to BSS2. AP3 and STA3 belong to BSS3. In the overlapped area, STA1, STA2 and STA3 can hear the transmissions from AP1, AP2 and AP3. If AP1 acquires the medium and communicates with STA1, the stations in BSS2 and BSS3 may use the invented SR-EDCA to contend the medium for spatial reuse transmission.

Similarly, if the STA2 or STA3 senses the channel idle using SR-EDCA mechanism, the STA2 or STA3 may initiate the SR transmission over the current on-going transmission, including the SR-Indication in the HE SIG field of the SR transmission to indicate the new transmission is a SR transmission.

When third party stations receive the SR transmission with the SR-Indication being set, they shall set the SR status to inactive not performing a new SR transmission over the current SR transmission.

Figure 3A:
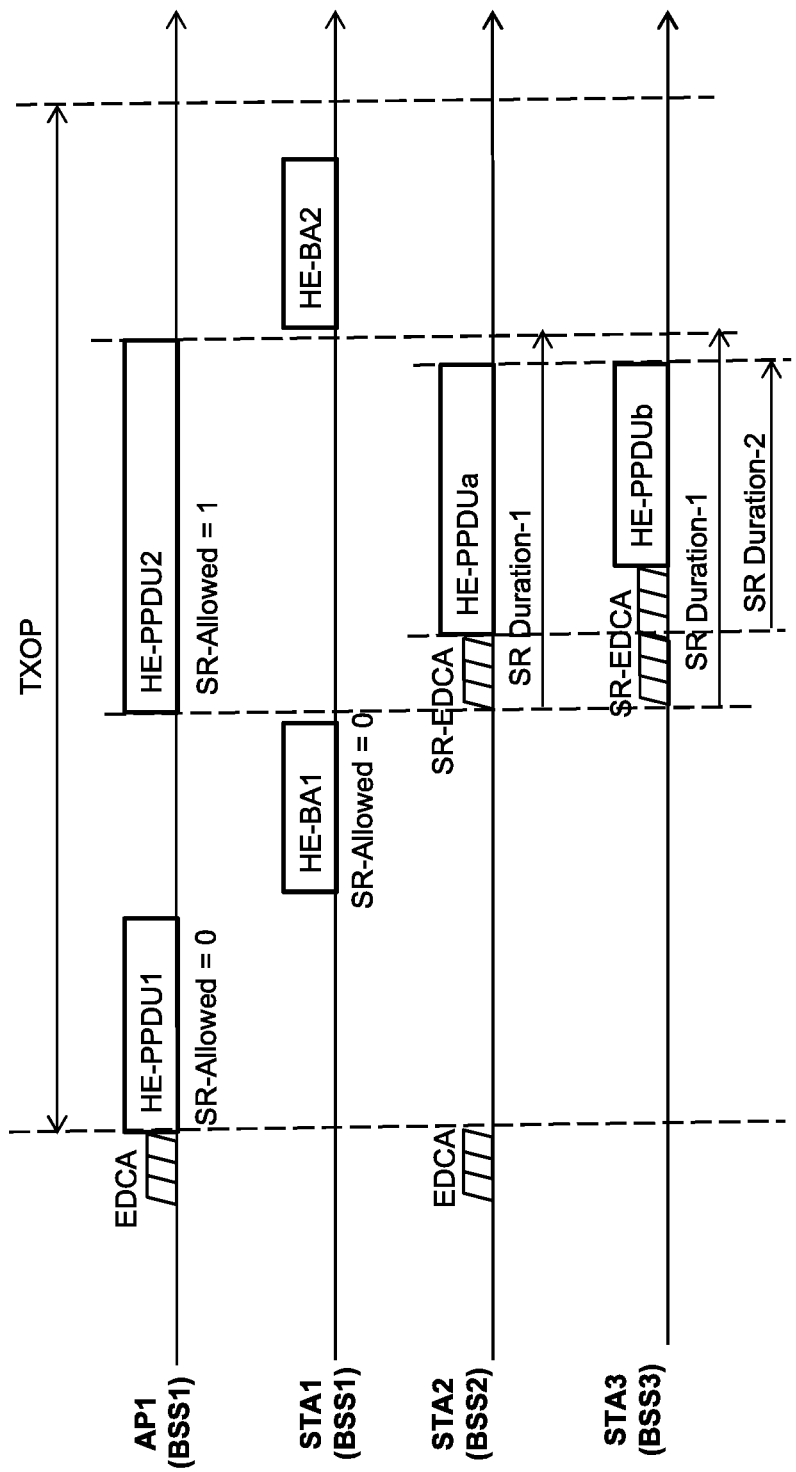
FIG. 3(A) shows an example of the spatial reuse transmissions that start and end within the spatial reuse duration.
Figure 3B:
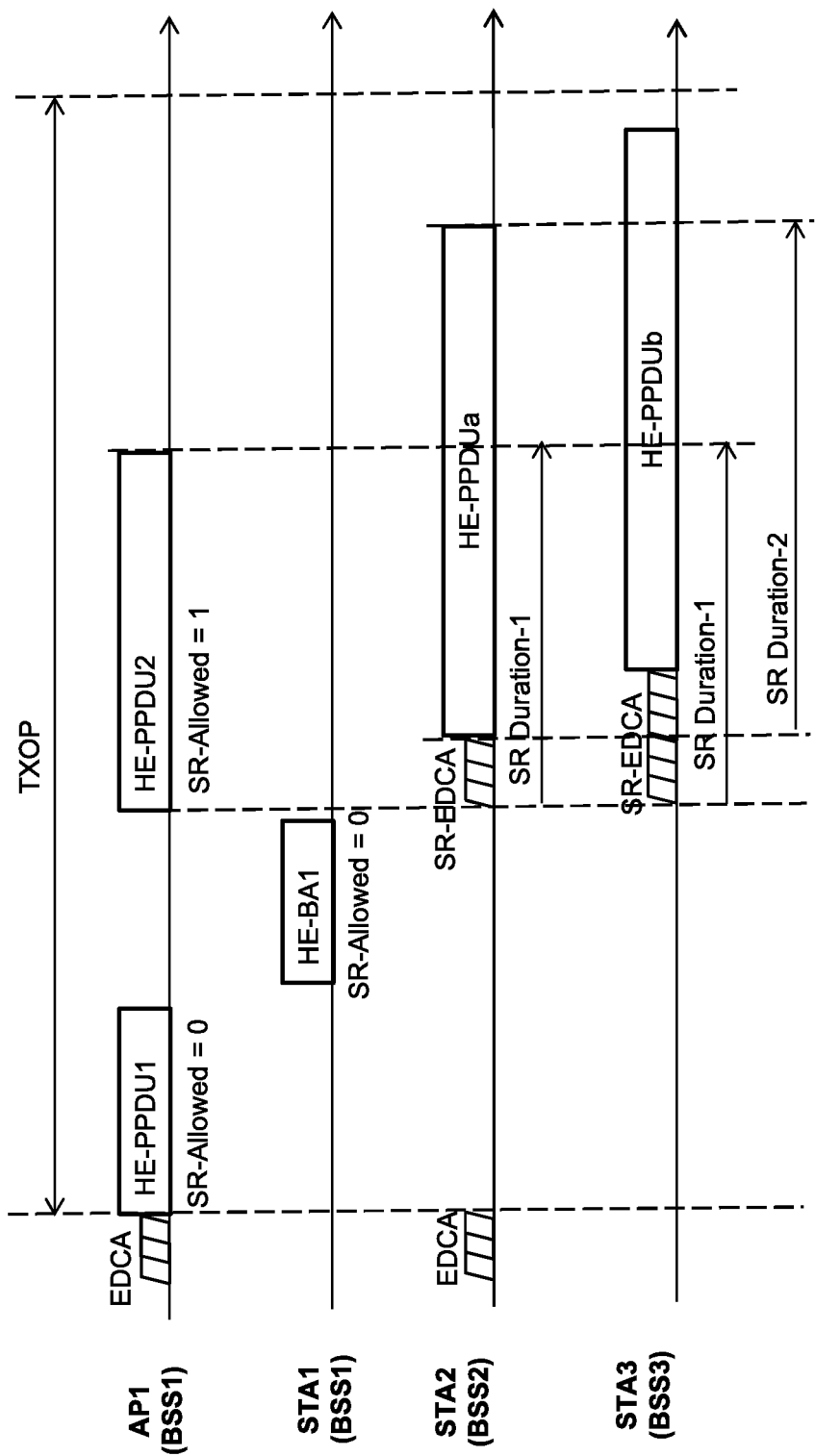
FIG. 3(B) shows an example of spatial reuse transmissions that start within the spatial reuse duration, and continue the transmissions after the spatial reuse duration timer expires.

FIG. 3 shows examples of SR transmission(s) in the time sequences. FIG. 3(A) shows an example of the spatial reuse transmissions that start and end within the spatial reuse duration. FIG. 3(B) shows an example of spatial reuse transmissions that start within the spatial reuse duration, and continue the transmissions after the spatial reuse duration ends.

The AP1 of high efficiency (HE) capability sends a PPDU1 to STA1 with the Color Code (CC) and SR Parameters (SRP) in SIG field of preamble. The STA1 station is also of HE spatial reuse capable station. After receiving the PPDU1 sent from the AP1, the STA1 responds with a BA1. The AP1 then continues sending the PPDU2 to STA1, etc. Meanwhile, the STA2 with SR capable in OBSS can also detect the PPDU1 from AP1, and the BA1 from the STA1. As PPDU1 and BA1 carry the CC and SRP information in SIG field of preamble, the STA2 can know the SINR headroom of the communication between AP1 and STA1 and calculate their path loss to the STA2. Therefore the STA2 can perform SR-EDCA mechanism to determine whether it could start a new SR transmission over the on-going communication between AP1 and STA1.

In one aspect, the SR-EDCA mechanism disclosed herein is an enhanced EDCA mechanism for spatial reuse. It may include of following:

A) SR state [N]: the array of SR states, each of which is used to track individual OBSS transmission for spatial reuse.

B) backoff mechanism in spatial reuse.

C) eCCAT[N]: it is an array of adjustable CCAT according to the target transmit power for initiating a new transmission in spatial reuse.

D) TXP[N] and/or MCS[N]: the target transmission power and/or MCS of new transmission in spatial reuse according to the OBSS RSSI measurement.

Here, N is the maximum number of supported spatial reuse transmissions.

The disclosed SR-EDCA may use the same backoff counters as the legacy EDCA mechanism, and applies enhanced CCAT for spatial reuse (i.e. SR-CCAT) to assess the medium occupancy status. SR-EDCA mechanism relies on the SR state to determine the current backoff procedure is under legacy EDCA or SR-EDCA mechanism. If the SR state is inactive, then the current backoff is under EDCA. Otherwise, if the SR state is active, the backoff counter is used by SR-EDCA mechanism.

The SR-EDCA uses the SR duration timer to track the time left in the SR state for the detected transmission. For the AP controlled SR (i.e. OBSS-PD based SR), the SR duration timer is set to the remaining time of the detected PPDU transmission if the TXOP duration subfield of HE-SIG-A field in detected PPDU transmission is all 1s, or otherwise the current TXOP value in HE-SIG-A field. For the transmitting station controlled SR, the SR duration timer is set to the remaining time of current PPDU. Then the SR duration timer counts down to track the remaining time for the SR transmission. During the spatial reuse period, if the STA detects a new spatial reuse transmission over on-going transmission(s), it may assign a new SR duration timer to track the new detected transmission if multiple SR states are allocated and one SR state is available. Once all the SR duration timers expire (=0), the SR capable STA sets the SR status to inactive and switches to the legacy EDCA from SR-EDCA mechanism for channel contention.

The SR-EDCA backoff counting is based on SR-CCA assessment.

Figure 4:
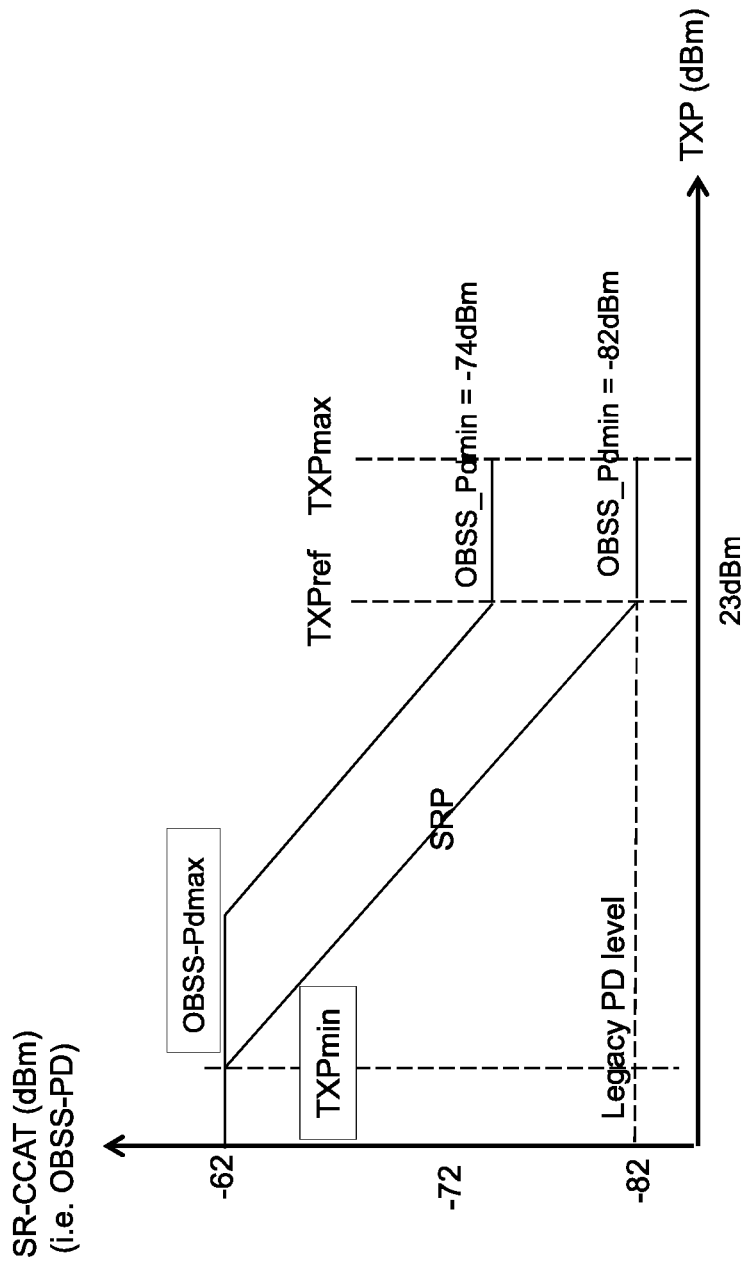
FIG. 4 shows an example of enhanced CCA threshold adjustment mechanism used for assessing the medium status in spatial reuse.

The SR-CCA mechanism relies on the clear channel assessment according to variable CCAT in the spatial reuse. FIG. 4 shows an example of the SR-CCAT mechanism, which the SR-CCAT threshold varies from the TX power. The lower transmit power, the higher SR-CCAT could be. However, the SR-CCAT level should not excess ED level (−62 dBm) or the value of OBSS-PDmax specified in the spatial reuse IE of beacon or probe response frames depending on the detection condition.

The legacy CCAT is set to the fixed threshold (−82 dBm for preamble detection) regardless of the transmission power as illustrated in the FIG. 4. When the SR STA detects RSSI level of preamble signal less than the CCAT (PD=−82 dBm), it assesses the channel as idle. If the RSSI is greater than the CCAT (−82 dBm), the channel is assessed as busy. If the SR STA cannot detect the preamble, it may perform energy detection of received signal and assess channel as idle if the RSSI is less than ED threshold or busy if RSSI is greater than ED threshold.

In the SR-CCAT mechanism, the channel assessment is associated with the estimated transmission power. In the AP controlled spatial reuse, the AP broadcast SR parameters in the beacon or probe response frame such as OBSS-PDmin and OBSS-PDmax. When the SR capable station receives those SR parameters, it then calculates the SR-CCAT according to the condition of receiving PPDUs. For example, the SR-CCAT threshold varies as the transmit power linearly. The lower the transmit power, the higher of the CCAT would be (the maximum SR-CCAT threshold is limited by the OBSS-PDmax). The SR capable station may increase its SR-CCAT threshold via lowering its transmit power. The SR capable station should use the OBSS-PD threshold below the curve of OBSS-PD.

For the transmitting STA controlled spatial reuse, the on-going STA sets the SPR index in the HE-SIG field of PPDU, which combines the transmit power and acceptable receiver interference. When the SR initiating station receives the PPDUs from the on-going transmissions and gets SRP information, the SR transmit power should be less than the SRP value minus RSSI measurement of PPDUs of the on-going transmissions. The SR capable station may derive the SR-CCAT threshold from the target transmitting power and other SR parameters.

The SR capable STA2 in FIG. 3 uses the EDCA mechanism to contend the medium with AP1 and STA1. If the AP1's backoff counter reaches 0 and sends a PPDU1 before the backoff counter of STA2 reaches 0, the SR capable STA2 may apply SR-EDCA to continue contending the medium depending on the channel condition. If the SR capable STA2 receives the preamble of PPDU1 from AP1 and finds that the AP1 disallows the SR transmission over its on-going transmission for the transmitting STA controlled SR, the SR capable STA2 will not enter the SR state to perform SR transmission. If the AP1 (and/or STA1) sets SRP in the HE-SIG-A of PPDU to allow the SR transmission over its on-going transmissions, the SR capable STA2 can enter the SR state to use SR-EDCA mechanism for the medium contention under SR condition. In the SR state, the virtual CCA is still applied.

The virtual CCA sensing is based on the information of NAVs: intra-BSS NAV and inter-BSS NAV. When the intra-BSS NAV timer does not expire, the STA2 suspends its backoff counters. The STA2 may need to update its intra-BSS NAV setting to the Duration field of received PPDU if the Duration is longer than the current value of intra-BSS NAV. Otherwise the STA2 checks the status of inter-BSS NAV timer. If the inter-BSS NAV timer does not expire, the STA2 suspends its backoff counter and continue monitoring the medium till the medium is sensed as idle again.

If the inter-BSS NAV timer of SR capable STA2 expires or is 0, it means the virtual CCA is clear. The STA2 may perform physical carrier sensing to determine the channel occupancy status.

The SR capable STA2 may need to update its inter-BSS NAV setting to the Duration field of received PPDU if the Duration is longer than the current value of inter-BSS NAV and the physical CCA sensing for spatial reuse indicates the medium is busy.

If the SR capable STA2 assesses the spatial reuse channel as idle, the SR capable STA2 should not update its NAV timer(s), whether the NAV timer(s) expire or not.

During the SR State active, the SR capable STA2 may perform the physical CCA over SR condition (i.e. SR-EDCA) to assess the medium status in parallel to the virtual CCA sensing. The SR capable STA2 may apply two kinds of CCAT in the carrier sensing: SR-CCAT (i.e. OBSS-PD) or ED threshold.

SR-CCAT (OBSS-PD) is based on the preamble detection (PD) and RSSI measurement of received signal from OBSS. The SR capable STA2 determines the SINR headroom and path loss in the received PPDU according to the information carried in the SIG of preamble of PPDU. Then it can calculate the target transmit power in the spatial reuse condition without interrupting the on-going PPDU transmission. The target transmit power should not be less than TXPmin, which is corresponding to the OBSS-PDmax. With the target transmit power for initiating a new transmission over on-going transmission and the information in SRP, the SR capable STA2 determines the threshold of SR-CCAT (i.e. OBSS-PD) which varies with the target transmit power and perform clear channel assessment for spatial reuse.

If the RSSI measurement of received PPDU (to be spatial reused with) is higher than the SR-CCAT (OBSS-PD), the STA2 suspends its backoff counter(s) and continues monitoring the medium until it becomes idle again. The SR capable STA2 updates the inter-BSS NAV timer if the Duration of received PPDU is longer than the current inter-BSS NAV timer.

If the RSSI measurement of received PPDU is less than the SR-CCAT (i.e. OBSS-PD), the STA2 assesses the medium as idle at SR condition, and decreases the backoff counter by 1, and continues sensing the medium with SR-CCAT, assuming the inter-BSS NAV timer has expired. If the STA2 cannot detect the preamble, it may use energy detection for the carrier sensing.

If the backoff counter(s) of SR capable STA2 reaches 0 and SR State is still active, the SR capable STA2 may start a SR transmission over the on-going transmission using either (A) the target transmit power determined by the latest RSSI measurement in the time slot which triggers the backoff counter to be 0; or (B) the average of target transmit power among the multiple measurement during the spatial reuse backoff period, (C) the minimum target transmit power among multiple measurements during the spatial reuse backoff period. If the backoff counter(s) of STA2 reaches 0 but SR State becomes inactive, then the SR capable STA2 should not adjust the transmit power. Instead, it uses full power to transmit a PPDU.

The SR capable STA2 (i.e. the SR initiator) may include the Spatial Reuse Indication in the HE-SIG-A of SR transmission to indicate that the current transmission is a spatial reuse transmission and request the spatial reuse responder to perform the virtual carrier sensing before responding to the spatial reuse transmission or set the acknowledgement policy to the delayed BA, or no ACK to the SR transmission or initiate an RTS/CTS frame exchange before the spatial reuse data transmission if the STA2 knows that the responder of SR transmission is a SR capable station. If the STA2 knows the responder of the SR transmission is a non SR capable station, it may initiate an RTS/CTS frame exchange before the spatial reuse data transmission or set the acknowledgement policy to the delayed BA, or no ACK for the non-spatial reuse capable STA to respond the SR transmission.

When the SR capable responder receives a RTS frame, it could examine its SR status and respond to the RTS with a CTS by adjusting the TX power conformant with the SRP value or the corresponding OBSS-PD level if its SR status is active.

When the SR capable responder receives the SR transmission with SR-Indication set to 1, it shall follow the SR responder's rule to perform the virtual carrier sensing before responding to the spatial reuse transmission, or defer the BA, or not respond to the SR transmission. Furthermore, the SR receiver could examine the SRP value of the on-going transmission and make a BA/Ack transmission decision conformant with the SRP value, or adjust the TX power and makes a BA/Ack transmission decision conformant with the corresponding OBSS-PD level.

When the third party stations receive the SR transmission with the SR-Indication being set, they shall set the SR Status to inactive and not initiate a new SR transmission over the current SR transmission.

In the spatial reuse, it is possible to have more than one SR transmissions over the on-going transmission(s).

In FIGS. 3(A) and 3(B), the SR capable STA2 can initiate a SR transmission of HE PPDUa over the on-going transmission of HE PPDU2. If the SR capable STA3 performs SR-EDCA as well during time of PPDU2 transmission, it may start another SR transmission of HE PPDUb over on-going transmissions of HE PPDU2 and HE PPDUa if its backoff counter is decreased to 0 after the SR STA2 transmits a HE PPDUa.

Similar to the SR capable STA2 contention, the SR STA3 starts SR EDCA with setting SR state active and enabling SR duration timer when it detects the AP1 allows SR transmission over its on-going transmission of HE PPDU2. The SR STA3 calculates the SINR headroom, the target transmit power for HE PPDUb without interrupt of HE PPDU2 transmission (the transmit power should not be less than TXPmin), and assesses the medium status using SR-CCAT like STA2.

If the measured RSSI of received HE PPDU2 is higher than the SR-CCAT at the given SRP and the target transmit power for initiating a transmission of HE PPDUb, the SR STA3 suspends its backoff counter and continues sensing the medium until it becomes idle again. In addition, the STA3 needs to update the inter-BSS NAV timer if the TXOP of received PPDU2 is longer than the current inter-BSS NAV timer.

If the SR capable STA3 detects the preamble of HE PPDU2 and measures RSSI of received HE PPDU2 lower than the SR-CCAT at the given SRP and the target transmit power for initiating a new transmission of HE PPDUb, the SR capable STA3 assesses the medium as idle and decreases its backoff counter(s) by 1 and continues performing carrier sensing with SR-CCAT. If the SR capable STA3 cannot detect the preamble or the symbols of PPDU, it may apply the energy detection threshold in the channel assessment. If the SR capable STA3 detects the RSSI of received signal higher than the ED threshold, it assesses the medium as busy. Otherwise, if the RSSI of received signal is less than the ED threshold, the SR capable STA3 assesses the medium as idle and decreases the backoff counter(s) by 1.

During the STA3 performing SR EDCA backoff period, if the SR capable STA2 starts its SR transmission over the on-going transmission of HE PPDU2, it would increase the interference level, which causes the SR capable STA3 to reconsider the SR condition change.

A) assigning to use a new SR state (i.e. SR duration timer) to track the SR duration of SR capable STA2 if multiple SR states are allocated and there is one available SR state.

B) re-calculating the target transmit power of HE PPDUb that does interrupt the on-going transmission of both HE PPDU2 and HE PPDUa.

C) using the RSSI of HE PPDU2 and HE PPDUa for clear channel assessment.

If the measured RSSI in a slot time is lower than the SR-CCAT (or ED when the preamble or IEEE802.11 based OFDM symbols cannot be detected) at the given SRP and the target transmit power for initiating a new transmission of HE PPDUb, the SR capable STA3 assesses the medium as idle and decreases its backoff counter(s) by 1. If the backoff counter(s) is decreased to 0, then the SR capable STA3 may start the SR transmission of HE PPDUb using (A) the target transmission power level over the on-going transmissions of HE PPDU2 and HE PPDUa which is determined by the latest RSSI measurement in the idle slot (i.e. it triggers the backoff counter to be 0), or (B) the average of target transmit power among multiple measurements during the spatial reuse backoff period, (C) the minimum target transmit power among multiple measurements during the spatial reuse backoff period.

If the measured RSSI is higher than the SR-CCA threshold at the given SRP and the target transmit power for initiating a new SR transmission of HE PPDUb, the SR capable STA3 may suspend its backoff counter and continue sensing the medium until it becomes idle again. In addition, the SR capable STA3 needs to update the inter-BSS NAV timer if the TXOP of received HE PPDU2 or HE PPDUa is longer than the current inter-BSS NAV timer setting of STA3.

The SR capable STA may need to update its SR duration timer or assign a new SR duration timer if the new SR transmission is detected. In the case of SR capable STA3, if the TXOP of received HE PPDUa is longer than the current value of SR duration timer, the SR capable STA3 shall update the SR duration timer to the value of TXOP of received HE PPDUa if only one SP duration timer of STA3 is allocated, or assign a new SR duration timer to track the spatial reuse time left for HE PPDUa if multiple SP duration timers of STA3 are allocated.

If the SR duration timer(s) do not expire, the SR capable STA3 may continue performing SR-EDCA to contend the medium in spatial reuse using the SR-CCAT for clear channel assessment if preamble or IEEE802.11 based OFDM symbols can be detected; or using the ED threshold if the signal cannot be identified. If all the SR duration timers expire, the SR capable STA3 may switch from the SR-EDCA to the legacy EDCA mechanism with the current values of EDCA backoff counters to continue performing the medium contention, and use full power for PPDU transmission if the medium is acquired.

During the TXOP of spatial reuse, if the first SR transmission occurs during the SR State active, the STA may adjust its transmit power to the target transmit power based on RSSI measurement for the SR transmission. If the SR State becomes inactive during the SR transmission, the STA may then resume to full power to transmit remaining PPDU.

Figure 5:
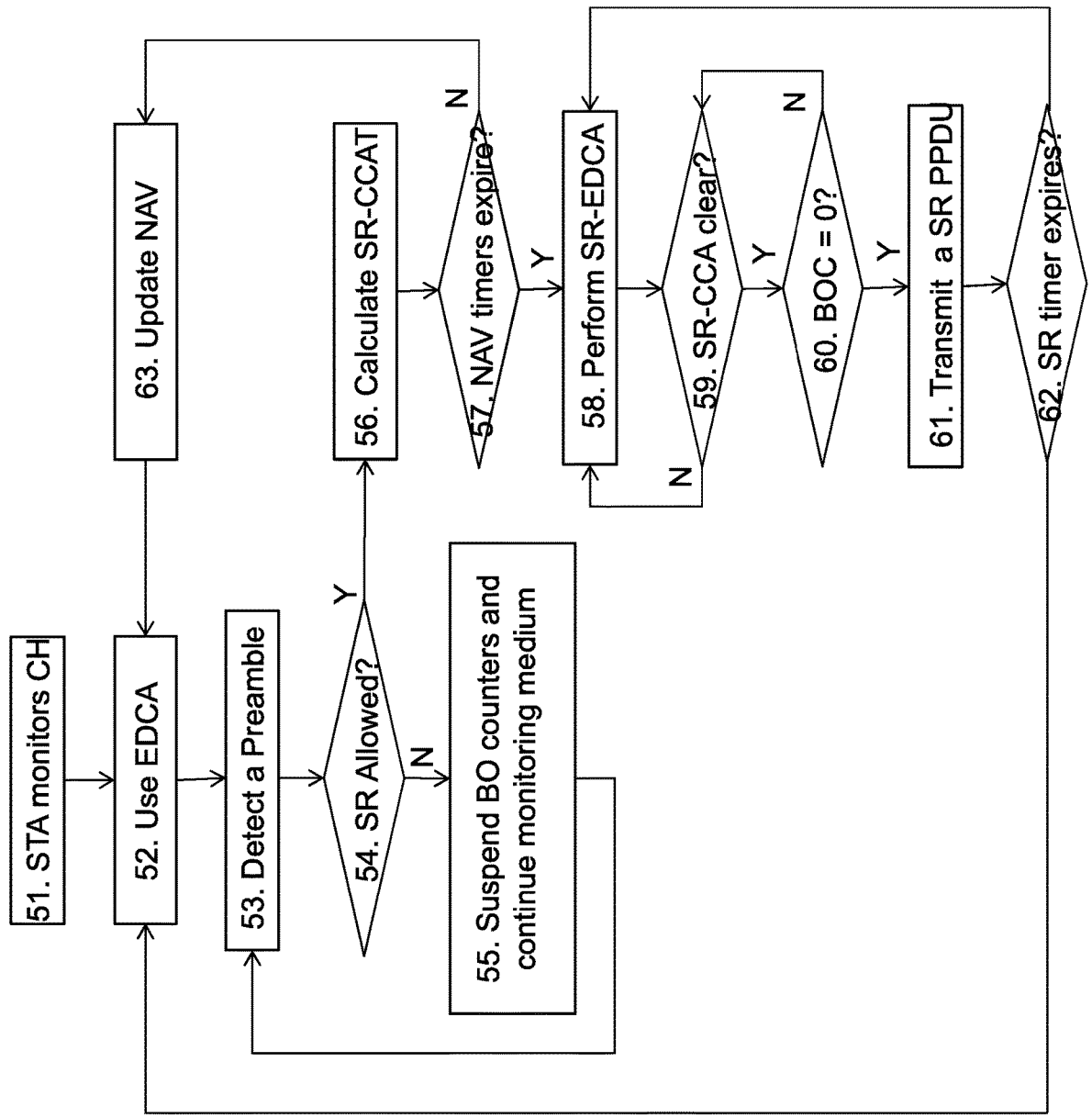
FIG. 5 shows an example procedure of the enhanced EDCA for spatial reuse scenario.

FIG. 5 shows an example of SR-EDCA procedure for contending the medium in spatial reuse with SR-CCAT.

51. A SR capable STA monitors the channel and prepares to contend the medium.

52. The SR capable STA uses the legacy EDCA mechanism for contention in the shared medium.

53. The SR capable STA detects a preamble of PPDU, and decodes the SIG to get further information about the PPDU.

54. The SR capable STA checks whether the SIG is set to disallow the SRP based spatial reuse over the on-going transmission of the PPDU.

55. The SR capable STA is informed that the SRP based spatial reuse over the on-going transmission is not allowed. It suspends its backoff counter(s) and continues monitoring the channel until the medium is idle again and resumes the backoff counting for contention.

56. Otherwise the SRP based SR is allowed and the SR capable STA enters the SR State. The SR capable STA sets up the SR duration timer to track the remaining time for SR and gets the RSSI measurement of received PPDU, calculates the target transmit power for initiating a new transmission in spatial reuse and the leftover headroom of SINR, and reliable MCS to adapt the spatial reuse for the receiver to decode the SR transmission.

57. The SR capable STA checks the intra-BSS NAV and inter-BSS NAV timer. If the NAV timer(s) does not expire, the SR capable STA may update NAV timer(s) using the TXOP information in the received PPDUs if:

(A) the new TXOP is longer than the current NAV timer value and (B) the SR CCA assesses the channel busy for AP controlled SR or SR conditions are not met for transmitting station controlled SR.

Otherwise, if the SR capable STA assesses the spatial reuse channel as idle, the SR capable STA should not update its NAV timer(s), whether the NAV timer(s) expire or not.

58. If the NAV timer expires, the SR capable STA performs the SR-EDCA for transmission over spatial reuse.

59. The SR capable STA assesses the channel on the spatial reuse condition using the SR-CCAT if it can detect the preamble of Wi-Fi symbol, or otherwise using the ED threshold.

60. If the channel is assessed as idle for aSlotTime using either SR-CCAT or ED threshold, the SR capable STA decreases the backoff counter(s) by one. If the backoff counter(s) does not reach 0, the SR capable STA continues assessing the medium at spatial reuse to see if it is idle.

61. If the backoff counter is decreased to 0 and the SR duration timer does not expire, then the SR capable STA starts transmitting a new PPDU in the spatial reuse over the on-going transmission, using the target transmit power determined by the latest RSSI measurement on the idle slot, or the average of the target transmit power among multiple measurements during the spatial reuse backoff period, or the minimum target transmit power among multiple measurements during the spatial reuse backoff period, and applying the reliable MCS. If the backoff counter is decreased to 0 but SR duration timer has expired, the SR capable STA starts transmitting a new PPDU in full power.

The SR capable STA may include the SR-Indication and set to the pre-determined value in the SR transmission to notify the responder of the SR transmission that the transmission is a SR frame and request the responder to perform the virtual carrier sensing before responding the SR transmission, or set the acknowledgement policy to the delayed BA, or no ACK to the SR transmission or initiate an RTS/CTS frame exchange before the spatial if the SR capable STA knows the responder is also a SR capable STA. Otherwise, if the SR capable STA knows the responder of the SR transmission is a non-SR capable station, it may initiate an RTS/CTS frame exchange before the spatial reuse data transmission and/or set the acknowledgement policy to the delayed BA, or no ACK for the non-spatial reuse capable STA to respond the SR transmission.

When the SR capable responder receives a RTS frame, it could examine its SR status and respond to the RTS with a CTS by adjusting the TX power conformant with the SRP value or the corresponding OBSS-PD level if its SR status is active.

When the SR responder receives the SR transmission with SR-Indication set to 1, it shall follow the SR responder's rule to perform the virtual carrier sensing before responding to the spatial reuse transmission, or defer the BA, or not respond to the SR transmission. Furthermore, the SR receiver could examine the SRP value of the on-going transmission and make a BA/Ack transmission decision conformant with the SRP value, or adjust the TX power and makes a BA/Ack transmission decision conformant with the corresponding OBSS-PD level.

When the third party stations receive the SR transmission with the SR-Indication being set, they shall not initiate a new SR transmission over the current SR transmission.

62. The SR capable STA checks whether the SR duration timer expires or not in parallel. If it does not expire, the SR capable STA may continue using the SR-EDCA to contend the medium for new SR transmission. Otherwise, if the SR duration timer expires, the STA switches back to the legacy EDCA mechanism with legacy CCAT threshold to contend the medium. If the backoff counter reaches 0, the STA transmits a PPDU with full power.

Figure 6A:
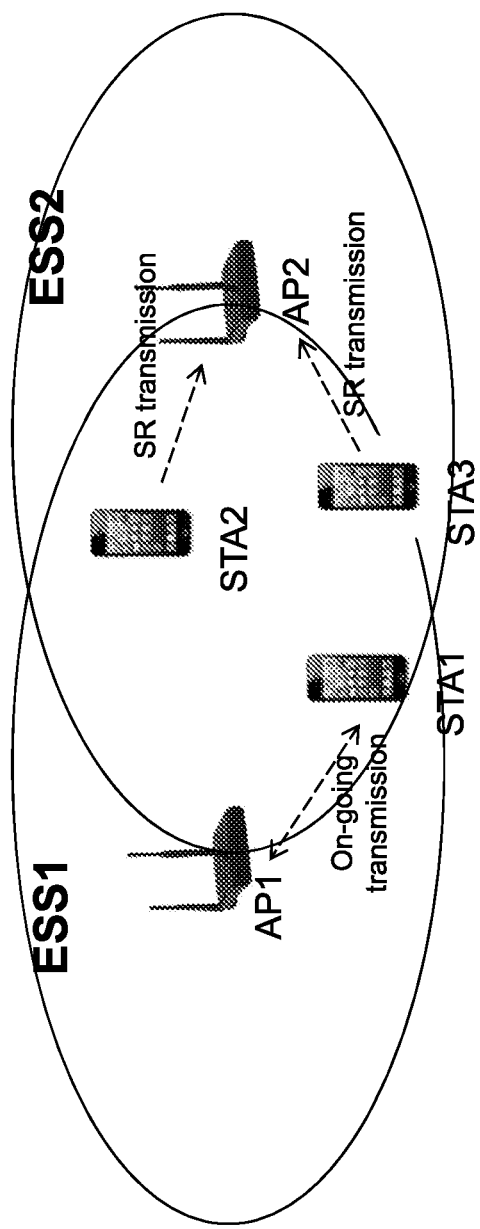
FIG. 6 shows an example of using intra-ESS and inter-ESS SR-EDCA to contend the medium and apply an appropriate transmit power for spatial reuse transmission.
Figure 6B:
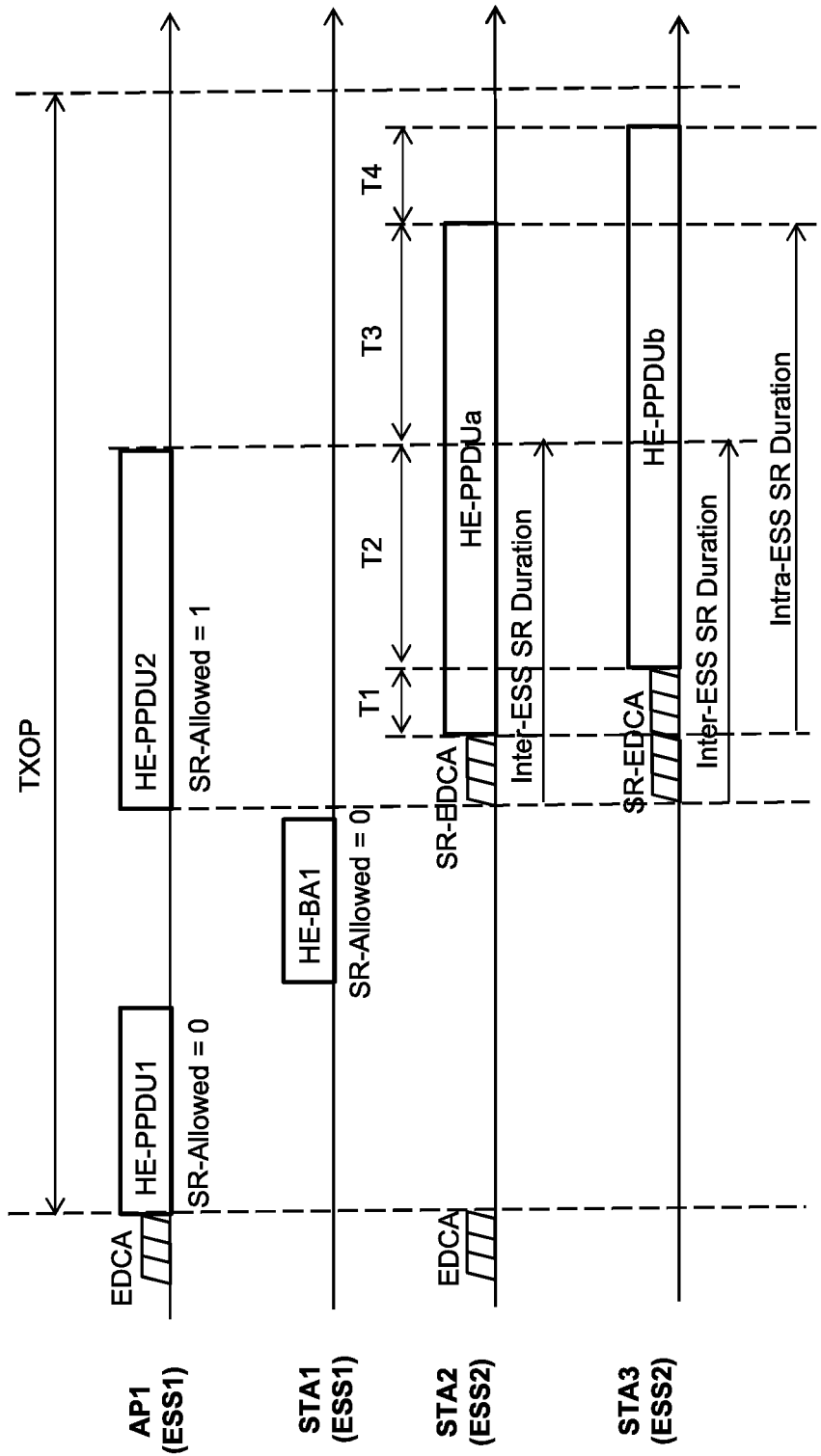

The enhanced EDCA mechanism can also be used in the either intra-ESSS or inter-ESS or both spatial reuse contentions. FIG. 6(A) shows an example of deployment for intra-ESS and inter-ESS spatial reuse. FIG. 6(B) shows an example of using enhanced EDCA mechanism to contend the medium for both intra-ESS and inter-ESS spatial reuse transmissions in time sequence.

In FIG. 6, the AP1 with SR capable belongs to a spatial reuse group (SRG) in ESS1 and sends a PPDU1 to its group member STA1 with SR capable. After receiving the PPDU1 sent from the AP1, the STA1 responds with a BA1 back to the AP1. The AP1 then continues sending the PPDU2 to STA1, etc. Meanwhile, the STA2 of SR capable in ESS2 can also detect the PPDU1 from the AP1 of ESS1, and the BA1 from the STA1 of ESS1. As the PPDU1 and BA1 carry the CC and SRP information in SIG field of preamble and the ESSID in the MAC header, the STA2 can know the PPDUs belonging to a spatial reuse group of inter-ESS and their SINR headroom of the communication between AP1 and STA1 of inter-ESS, and calculate their path loss to the STA2. Therefore the STA2 can use the inter-ESS spatial reuse SR-EDCA mechanism to contend the medium and to determine whether it could be able to start a new SR transmission over the on-going communication between AP1 and STA1 of inter-ESS. The STA3 of SR capable may also detect the transmissions of PPDU1 and BA1 in ESS1 and PPDUa in ESS2 according the preamble and MAC header information of received PPDUs and determine whether a PPDU comes from inter-ESS or intra-ESS.

In order to distinguish the SR-EDCA in the intra-ESS and/or inter-ESS spatial reuse contention, the spatial reuse STA may define two SR states, one for intra-ESS and another for inter-ESS. The SR state of either intra-ESS or inter-ESS may include the following:

A) SR status: indicating the spatial reuse is inactive or active. The default value is inactive.

(a) For the AP controlled spatial reuse, when a SR capable STA receives OBSS-PD information in the beacon or probe response frames, the STA shall set the SR status to active when it receives an OBSS PPDU, which means the AP controlled SR transmission is permitted.

(b) For the transmitting STA controlled spatial reuse, if the SR capable STA receives the SRP subfield in HE-SIG-A of PPDU with the indication of SR disallowed, the STA shall set the SR Status to inactive. Otherwise, if the SR capable STA receives the SRP in HE-SIG-A of PPDU with the indication of SR allowed, the STA shall set the SR Status to active.

For either the AP controlled spatial reuse or transmitting STA control spatial reuse, if the third party SR capable STAs receive a SR PPDU with the SR-Indication in HE-SIG-A field being set to 1 (i.e. pre-determined value), the third party SR capable STAs shall set the SR status to inactive to disable a new SR transmission over that on-going transmission.

B) SR duration timer: it is used to track the remaining time of spatial reuse.

(a) For the AP controlled SR, the SR duration timer is set to the remaining time of the detected PPDU transmission if the TXOP duration subfield of HE-SIG-A field in detected PPDU transmission is all 1s, or the current TXOP value in the HE-SIG-A field of received PPDU if the TXOP value is not all 1s.

(b) For the transmitting station controlled SR, the SR duration timer is set to the remaining time of current PPDU.

Once the SR status becomes active, the SR duration timer starts to count down to track the spatial reuse time left. When the SR duration timer expires, it may set the SR status to inactive.

The SR-EDCA for intra-ESS and/or inter-ESS spatial reuse consists of following parameters and methods.

A) SR state (aESS): it is used to track the spatial reuse status in aESS, where aESS is a variable of "intra-ESS" or "inter-ESS".

B) backoff mechanism for spatial reuse: it is shared by legacy EDCA, intra-ESS SR EDCA and inter-ESS SR EDCA mechanism.

C) eCCAT (aESS): it is the CCAT according to the target transmit power for initiating a new transmission in spatial reuse for aESS, where aESS is a variable of "intra-ESS", or "inter-ESS". As spatial reuse policy for intra-ESS and inter-ESS spatial reuse groups could be different, the eCCAT may vary for the intra-ESS and inter-ESS.

D) TXP (aESS) and/or MCS (aESS): the transmit power and/or MCS of new spatial reuse transmission in intra-ESS or inter-ESS spatial reuse, where aESS is a variable of "intra-ESS", or "inter-ESS".

The intra-ESS SR-EDCA shares the same backoff counters with the legacy EDCA mechanism, and applies the intra-ESS SR-CCAT threshold to assess the medium status. The intra-ESS SR-EDCA method uses the SR state for intra-ESS (i.e. SR-status (intra-ESS)) to indicate whether the current backoff procedure is in the process of intra-ESS SR-EDCA. If the intra-ESS SR state is active, the backoff counter is used by the intra-ESS SR-EDCA mechanism.

The inter-ESS SR-EDCA is similar to the intra-ESS and shares the same backoff counters with the legacy EDCA mechanism, but uses the inter-ESS SR-CCAT threshold to assess the medium status. The inter-ESS SR-EDCA method uses the inter-ESS SR state (i.e. SR-state (inter-ESS)) to indicate whether the current backoff procedure is in the inter-ESS SR-EDCA. If the inter-ESS SR state is active, the backoff counter is used by the inter-ESS SR-EDCA mechanism for inter-ESS contention.

The SR duration timer for intra-ESS is used to track the time left over for intra-ESS spatial reuse, while the SR duration timer for inter-ESS is used to track the time left over inter-ESS spatial reuse. If the SR duration timer of intra-ESS or inter-ESS expires, the SR status for either intra-ESS or inter-ESS may be set to inactive accordingly.

As the intra-ESS and inter-ESS spatial reuse may have different spatial reuse policy, the intra-ESS and inter-ESS SR-CCAT thresholds may be different. Typically the intra-ESS SR-CCAT (i.e. intra-ESS OBSS-PD) may be more relax than the inter-ESS SR-CCAT (i.e. inter-ESS OBSS-PD).

A STA may apply a different CCAT for intra-ESS or inter-ESS spatial reuse depending on the different cases.

(a) Energy Detection threshold: if the SR state for either intra-ESS or inter-ESS is active, but the preamble or IEEE802.11 OFDM symbol of received signal cannot be identified, the eCCAT is set to the ED threshold to assess the channel occupancy.

(b) Adjust SR-CCAT: if either the intra-ESS or the inter-ESS SR State is active, and the STA can detect the preamble of received signal or identify the received symbols as IEEE802.11 OFDM symbol, then the STA may choose either the inter-ESS SR-CCAT (i.e. inter-ESS OBSS-PD) or intra-ESS SR-CCAT (i.e. intra-ESS OBSS-PD) to assess the channel occupancy depending on the received PPDU.

(c) Maximum Preamble Detection threshold for OBSS (OBSS-PDmax). This parameter carried in SR IE of beacon or probe response frame defines the maximum PD level of carrier sensing for OBSS (i.e. OBSS-PDmax). The eCCAT may not apply adjustable SR-CCAT threshold beyond the OBSS-PDmax for intra-ESS or inter-ESS in the clear channel assessment.

The SR capable STA performs the backoff procedure of enhanced EDCA to contend the medium for spatial use according to the different condition in intra-ESS or inter-ESS:

If the SR capable STA is in spatial reuse of either intra-ESS or inter-ESS, but cannot detect the preamble of PPDU or identify the received symbols as IEEE802.11 OFDM symbols, it may use the ED threshold for channel assessment. If the RSSI of received signal is higher than the ED threshold, the SR capable STA assesses the channel as busy and suspend its backoff counters. If the RSSI of received signal is lower than the ED threshold for a slot time, the SR capable STA assesses the channel as idle and decreases the backoff counter by one, and continues sensing the channel. If the backoff counter is decreased to 0, the STA may send a PPDU.

The SR capable STA may include the SR-Indication which is set to the pre-determined value in the SR transmission to notify the responder of the SR transmission that the transmission is a SR frame and request the responder to perform the virtual carrier sensing before responding the SR transmission, or set the acknowledgement policy to the delayed BA, or no ACK to the SR transmission or initiate an RTS/CTS frame exchange before the spatial reuse data transmission if the SR capable STA knows the responder is also a SR capable STA. Otherwise, if the SR capable STA knows the responder of the SR transmission is a non-SR capable station, it may initiate an RTS/CTS frame exchange before the spatial reuse data transmission or set the acknowledgement policy to the delayed BA, or no ACK for the non-spatial reuse capable STA to respond the SR transmission.

When the SR capable responder receives a RTS frame, it could examine its SR status and respond to the RTS with a CTS by adjusting the TX power conformant with the SRP value or the corresponding OBSS-PD level if its SR status is active.

When the SR capable responder receives the SR transmission with SR-Indication being set, it shall follow the SR responder's rule to perform the virtual carrier sensing before responding to the spatial reuse transmission, or defer the BA, or not respond to the SR transmission. Furthermore, the SR receiver could examine the SRP value of the on-going transmission and make a BA/Ack transmission decision conformant with the SRP value, or adjust the TX power and makes a BA/Ack transmission decision conformant with the corresponding OBSS-PD level.

When the third party stations of the SR capable receive the SR transmission with the SR-Indication being set, they are not allowed for performing a new SR transmission.

If the SR capable STA is in spatial reuse of either intra-ESS or inter-ESS state, and can detect the preamble of PPDU and identify the signal from an intra-ESS or inter-ESS, it may use the adjustable intra-ESS or inter-ESS SR-CCAT threshold to assess the channel accordingly. If the RSSI of received PPDU is higher than the corresponding ESS SR-CCAT threshold, the SR capable STA assesses the channel as busy and suspends the backoff counter. Otherwise, it assesses the channel as idle and decreases the backoff counter by one. If the backoff counter is decreased to 0, then the SR capable STA may send a PPDU using the appropriate transmit power.

If the adjustable SR-CCAT threshold is beyond OBSS-PDmax for inter-ESS or intra-ESS, the STA may limit the adjustable SR-CCAT to the OBSS-PDmax.

In both intra-ESS and inter-ESS SR states active case, if the RSSI of received PPDU is higher than the corresponding ESS OBSS-PDmax threshold, the STA assesses the channel as busy and suspends the backoff counter. In other word, the channel assessment is based on the more restrict ESS SR-CCAT threshold. For example, the inter-ESS SR-CCAT is lower (more restrict) than the intra-ESS SR-CCAT threshold, the channel assessment may be based on the inter-ESS SR-CCAT, and assess the channel busy if the RSSI of received PPDU is higher than that threshold.

If only inter-ESS SR state or intra-ESS SR state is active, the STA uses the adjustable SR-CCAT of active ESS SR state as the carrier sensing threshold to assess the channel occupancy.

If the backoff counter reaches 0, the STA may choose the appropriate transmit power according to the following situation.

(a) when the backoff counter is 0, and the SR duration timers for both inter-ESS and intra-ESS have expired, the STA may use the full power to transmit a PPDU.

(b) when the backoff counter is 0, but one of inter-ESS SR duration timer or intra-ESS SR duration timer does not expire, the STA may determine the transmit power via.

Option (1): the target transmit power for initiating a spatial reuse transmission without interrupting on-going transmission measured at the time slot at which the backoff counter is reduced to 0.

Option (2): the average of target transmit power for initiating a spatial reuse transmission without interrupting the on-going transmission(s) measured during the spatial reuse backoff period.

Option (3): the target transmit power for initiating a spatial reuse transmission without interrupting the on-going transmission(s) measured at the time of detecting the maximum RSSI level of received signal during the spatial reuse backoff period.

(c) when the backoff counter is 0, and both inter-ESS and intra-ESS SR duration timers do not expire, the STA may transmit a PPDU with the minimum transmit power target for the inter-ESS and intra-ESS calculated in the method of option (1), (2) and (3). The STA may include the SR-Indication in the HE-SIG-A field to indicate the current transmission is a SR transmission and request the SR responder to perform virtual CCA before responding the spatial reuse transmission, or set the acknowledgement policy to defer BA or not respond to the SR transmission, or initiate an RTS/CTS frame exchange before the spatial reuse data transmission if the STA knows that the responder of SR transmission is a SR capable station. If the STA2 knows the responder of the SR transmission is a non SR capable station, it may initiate an RTS/CTS frame exchange before the spatial reuse data transmission or set the acknowledgement policy to defer the BA, or no ACK to the SR transmission. Once the SR capable STA starts the spatial reuse transmission with the target transmit power, it can continue the transmission with:

(a) a fixed transmit power during the entire transmission, or (b) adaptive spatial reuse transmit power to the spatial reuse condition change. For example, if SR duration timers expire during the spatial reuse transmission, the SR capable STA may change the transmit power to full power.

When the SR capable responder receives a RTS frame, it could examine its SR status and respond to the RTS with a CTS by adjusting the TX power conformant with the SRP value or the corresponding OBSS-PD level if its SR status is active.

When the SR capable responder receives the SR transmission with SR-Indication set to 1, it shall follow the SR responder's rule to perform the virtual carrier sensing before responding to the spatial reuse transmission, or defer the BA, or not respond to the SR transmission. The SR capable receiver could examine its SR state and make a BA/Ack transmission decision immediately by adjusting the TX power conformant with the corresponding OBSS-PD level or SRP value if its SR status is active. The spatial reuse capable receiver may perform the virtual carrier sensing before responding to the spatial reuse transmission when receiving a transmission with an SR-Indication being set and adjusts the TX power conformant with the corresponding OBSS-PD level or SRP value if its SR status is active.

When the third party stations receive the SR transmission with the SR-Indication being set, they shall not initiate a new SR transmission over the current SR transmission.

In the FIG. 6(B) of using enhanced EDCA to contend the channel for intra-ESS and inter-ESS spatial reuse, the SR capable STA may apply the appropriate the transmit power of the spatial reuse transmission.

For example, if the STA2 is in the time (T1) of the inter-ESS SR state active only, it may use the inter-ESS SR-CCAT to assess the medium occupancy and use the target transmit power for initiating an inter-ESS spatial reuse transmission.

If the STA3 is the time (T2) of both intra-ESS SR state and inter-ESS SR state active, it may use the more restrict ESS SR-CCAT threshold to assess the medium occupancy and use the corresponding target transmit power for initiating a spatial reuse transmission.

If the STA3 is the time (T3) of the intra-ESS SR state active only, it may use the intra-ESS SR-CCAT to assess the medium occupancy and use the target transmit power for initiating an intra-ESS spatial reuse transmission.

If the STA3 is in the time (T4) of both intra-ESS and inter-ESS states inactive, it may apply legacy CCAT to assess the channel occupancy and transmit a PPDU with the normal transmit power.

The SR STA can use following formula to calculate:

$$\text{SINR-HR} = \text{measured RSSI} - \text{minimum RSSI for that MCS} \quad \text{Eq. (1)}$$

where "minimum RSSI" may be a value that is decided a priori for a given deployment or a given cellular network.

$$\text{Path Loss (STA-}m\text{)} = \text{TXP (STA-}m\text{)} - \text{measured RSSI (STA-}m\text{)} \quad \text{Eq. (2)}$$

The target transmit power that does not impact the current transmission on "STA-m."

$$\text{Target Tx Power (STA-}m\text{)} = \text{Path Loss (STA-}m\text{)} + \text{SINR-HR(STA-}m\text{)} + \text{Delta-}B \quad \text{Eq. (3)}$$

The SR STA should calculate the Target Tx Power (STA-m) for all "m", and find the optimized TX power (OTXP) for a new transmission.

$$\text{OTXP} = \min (\text{target Tx Power (STA-}m\text{)}); \text{ for all "}m\text{"} \quad \text{Eq. (4)}$$

In some embodiments, a method of wireless communication includes identify, by a wireless communication device, one or more transmissions for spatial reuse, tracking the spatial reuse period via a timer for each identified transmission for spatial reuse.

In some embodiments, a method of wireless communication includes identify, by a wireless communication device, the spatial reuse period, performing interference measurement of a wireless transmission medium, and adjusting a wireless clear channel assessment threshold in spatial reuse. The clear channel assessment is based on the information including one or more of: (a) a transmit power used for the current wireless transmission; (b) a headroom of Signal to Interference and Noise Ratio (SINR) left in the current wireless transmission according the interference measurement; and (c) the target transmit power for initiating a new transmission without interrupting the on-going transmission for spatial reuse.

In some embodiments, an apparatus for wireless communication includes a memory that stores executable instructions, and a processor that reads the executable instructions from the memory to control one or more modules of the wireless communication apparatus to perform interference measurement of a wireless transmission medium, and perform a wireless clear channel assessment in spatial reuse. The clear channel assessment for spatial reuse is based on the information including one or more of (a) a transmit power used for the current wireless transmission, (b) a headroom of Signal to Interference and Noise Ratio (SINR) left in the current wireless transmission according the interference measurement; and (c) the target transmit power for initiating a new transmission over the on-going transmission for spatial reuse. Various examples are given with respect to Eq. (1) to Eq. (4).

In some embodiment, a method of enhanced distributed channel access for spatial reuse includes determining, prior to performing a new transmission over the on-going transmission, the channel access assessment based on the information including one or more of (a) spatial reuse information in the beacon or probe response frame for the AP controlled SR, and the SRP information in HE-SIA-A for the SRP based spatial reuse; (b) virtual carrier sensing (NAV) timer has expired; (c) the backoff counter for the spatial reuse has been decreased to 0, wherein the backoff counters of EDCA are conducted according to the adjustable clear channel assessment threshold for spatial reuse when the preamble or OFDM symbols of PPDU can be detected or otherwise the energy detection threshold during the spatial reuse period if the signal cannot be identified. Various examples of EDCA for spatial reuse are provided in the present document.

In some embodiments, a method of wireless communication includes sensing, prior to performing a transmission, a medium for received signal strength, performing, if the sensed received signal strength is below a threshold of clear channel assessment for spatial reuse when the preamble or OFDM symbols of PPDU can be detected, or otherwise the energy detection threshold during the spatial reuse period, the transmission, receiving, if the sensed received signal strength is above the threshold of clear channel assessment for spatial reuse, a PHY transmission, attempting to decode the PHY transmission, extracting, when the attempt to decode the PHY transmission is successful, spatial reuse information for clear channel assessment from the PHY transmission, and adjusting, based on the received spatial reuse information, a value of the clear channel access threshold.

In some embodiments, a method of wireless communication includes identifying, by a wireless communication device, the spatial reuse period for intra-ESS or inter-ESS, performing interference measurement of a wireless transmission medium, and adjusting a wireless clear channel assessment threshold in differ ESS spatial reuse policy and method, and determining the transmit power of initiating a new transmission according to (a) measured at the time of triggering the backoff timer to be 0, (b) averaging the target transmission power measured during the spatial reuse backoff period, (c) the minimum target transmit power measured during the spatial reuse backoff period.

Figure 7:
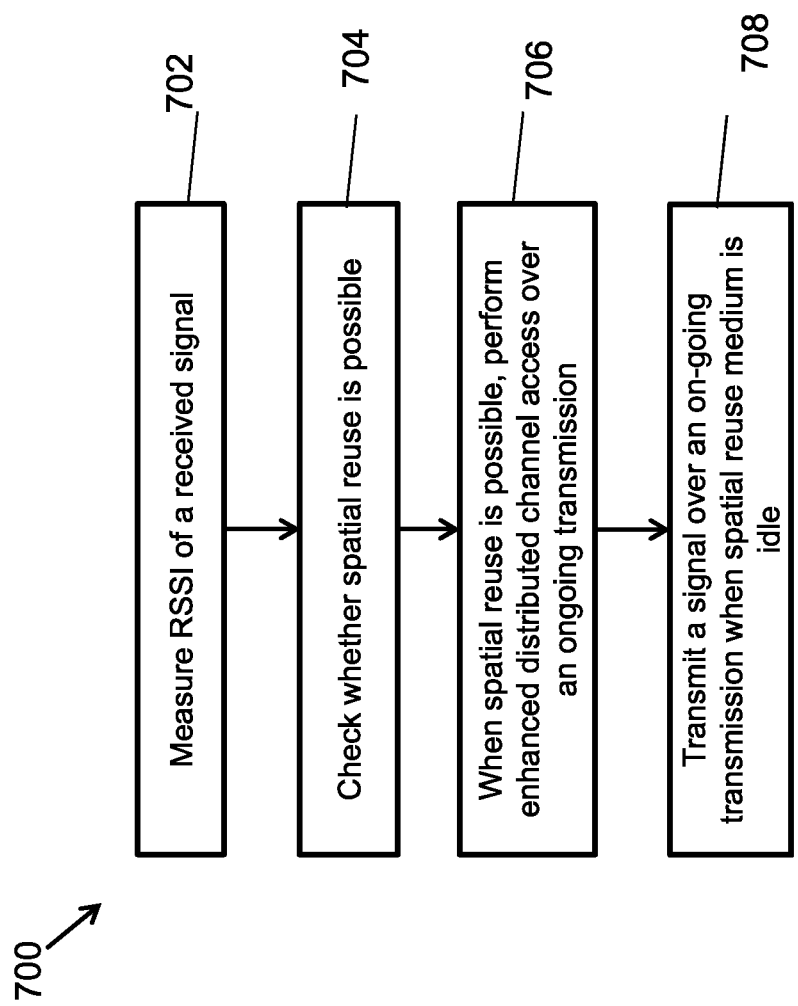
FIG. 7 is a flowchart of an example of a wireless communication method.

FIG. 7 shows a flowchart of an example method 700 of wireless communication. The method 700 includes measuring (702) signal strength of a received signal transmission, checking (704), based on the received signal transmission, whether a condition for spatial reuse of transmission resources by sharing time and/or frequency of an on-going transmission, is met, performing (706), when the checking indicates that the condition for spatial reuse of transmission resource is met, enhanced distributed channel access (EDCA) over the on-going transmission, and transmitting (708), based on EDCA, a signal over the on-going transmission.

In some embodiments, the checking operation 704 may include ascertaining the condition for spatial reuse by decoding a field from the received signal transmission. In some embodiments, the method 700 may further include calculating transmit power value of the signal based on the signal strength of the received signal transmission.

Figure 8:
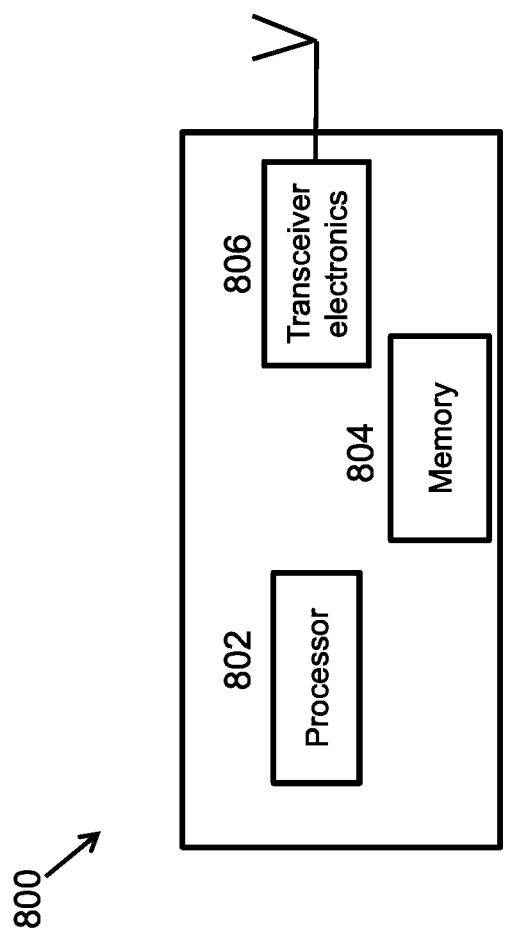
FIG. 8 is a block diagram of an example of a wireless communication apparatus configured to implement a method described in the present document.

FIG. 8 is a block diagram showing an example of a wireless communication device 800 that implements any of the methods described in the present document. The apparatus 800 includes at least one processor 802, at least one memory 804, and at least one transceiver 806 coupled to an antenna. The processor may be configured to execute software code and implement a method described herein. The memory 804 may be used to store data and instructions (or code) that can be used by the processor. The transceiver electronics 806 may implement the transmission and reception mechanisms described herein.

FIG. 9 shows a flowchart of an example method 900 of wireless communication. The method 900 includes performing (902), by a wireless communication device, measurement of received signal strength indication of an on-going transmission.

The method 900 includes calculating (904) a target transmission power and a clear channel assessment (CCA) threshold for initiating a spatial reuse transmission over the on-going transmission without interruption.

The method 900 includes comparing (906) the received signal strength indication with the CCA threshold for the spatial reuse transmission for assessing availability of transmission medium for spatial reuse.

The method 900 includes performing (908), when the transmission medium is available for spatial reuse, an enhanced distributed channel access (EDCA) over the on-going transmission.

The method 900 includes transmitting (910) a wireless signal over the on-going transmission using the calculated target transmission power, if the CCA indicates that the transmission medium is available for spatial reuse.

In some embodiments, the method 900 may further include determining an inter-intra extended service set (ESS) status of the on-going transmission, and using the determination of the inter-intra ESS status to calculate the CCA.

In some embodiments, in operation 906, the operation of assessing availability of the transmission medium includes reading a flag in a received message.

In some embodiments, the method 900 further includes counting down a backoff timer for spatial reuse transmission based on the CCA threshold for the spatial reuse transmission.

It will be appreciated that several techniques for spatial reuse of transmission resources in a wireless transmission network are disclosed. In one aspect, spatial reuse enables a second transmitter to transmit during a same time slot and/or using a same frequency band, as an on-going transmission.

It will be appreciated that, in some embodiments, the spatial reuse EDCA and legacy EDCA shares the same backoff timer for contending the medium, but spatial reuse EDCA uses adjustable CCA threshold for clear channel assessment.

It will further be appreciated that, in some embodiments, the spatial reuse EDCA relies on a timer or multiple timers to track the spatial reuse period. For single OBSS spatial reuse, SR EDCA could use single timer for tracking SP period. For multiple OBSS, the SR EDCA may use multiple timers, each of which to track an OBSS. The inter-ESS can be considered as a special OBSS.

The spatial reuse EDCA use adjustable CCA threshold. The adjustable threshold determination is based on the expected transmission power of the spatial reuse transmission. If the STA can detect the preamble and decode the SIG of received frame, then it may use adjustable CCA threshold to clear channel assessment. Otherwise, it may use ED to CCA threshold during the SP duration. The inter-ESS and intra-ESS OBSS may have different spatial reuse policy and different spatial reuse parameter. SR EDCA may use a stricter threshold to assess the channel occupancy.

In various embodiments, transmission power of spatial reuse may be performed using one of the following options:

a) the TXP determined by the latest RSSI measurement at the time slot that triggers backoff counter to be 0, b) the TXP for spatial reuse transmission via averaging RSSI measurement during the spatial reuse backoff period, c) the minimum TXP determined by multiple RSSI measurements during the spatial reuse backoff period.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:

performing, by a wireless communication device, measurement of received signal strength indication of an on-going transmission;

calculating a target transmission power and a clear channel assessment (CCA) threshold for initiating a spatial reuse transmission over the on-going transmission without interruption, wherein the CCA threshold that is constrained by an overlapping basic service set preamble detection (OBSS-PD) value in a range of [−82, −62] dBm increases linearly as the target transmission power decreases, wherein the calculating of the CCA threshold comprises determining an inter-intra extended service set (ESS) status of the on-going transmission, wherein a first CCA threshold corresponding to the inter-ESS status is lower than a second CCA threshold corresponding to the intra-ESS status;

comparing the received signal strength indication with the CCA threshold for the spatial reuse transmission for assessing availability of transmission medium for spatial reuse; and performing, upon determining that the transmission medium is available for spatial reuse based on the CCA threshold, an enhanced distributed channel access (EDCA) transmission over the on-going transmission using the calculated target transmission power within a spatial reuse duration.

2. The method of claim 1, wherein the assessing availability of the transmission medium includes reading a flag in a received message.

3. The method of claim 1, further including:
counting down a backoff timer for spatial reuse transmission based on the CCA threshold for the spatial reuse transmission.

4. A wireless transmission apparatus comprising a memory, a processor and a transmission circuit and a receiver circuit, wherein the processor reads instruction code from the memory and controls the transmission circuit and the receiver circuit to:
perform measurement of received signal strength indication of an on-going transmission;
calculate a target transmission power and a clear channel assessment (CCA) threshold for initiating a spatial reuse transmission over the on-going transmission without interruption, wherein the CCA threshold that is constrained by an overlapping basic service set preamble detection (OBSS-PD) value in a range of [−82, −62] dBm increases linearly as the target transmission power decreases, wherein calculating of the CCA threshold comprises determining an inter-intra extended service set (ESS) status of the on-going transmission, wherein a first CCA threshold corresponding to the inter-ESS status is lower than a second CCA threshold corresponding to the intra-ESS status;
compare the received signal strength indication with the CCA threshold for the spatial reuse transmission for assessing availability of transmission medium for spatial reuse; and
perform, upon determining that the transmission medium is available for spatial reuse based on the CCA threshold, an enhanced distributed channel access (EDCA) transmission over the on-going transmission using the calculated target transmission power within a spatial reuse duration.

5. The apparatus of claim 4, wherein the processor is configured to assess availability of the transmission medium by reading a flag in a received message.

6. The apparatus of claim 4, wherein the processor is configured to:
count down a backoff timer for spatial reuse transmission based on the CCA threshold for the spatial reuse transmission.

7. A non-transitory computer program product having code stored thereon, the code, when executed by a processor, causing the processor to implement a method that comprises:
performing, by a wireless communication device, measurement of received signal strength indication of an on-going transmission;
calculating a target transmission power and a clear channel assessment (CCA) threshold for initiating a spatial reuse transmission over the on-going transmission without interruption, wherein the CCA threshold constrained by an overlapping basic service set preamble detection (OBSS-PD) value in a range of [−82, −62] dBm increases linearly as the target transmission power decreases, wherein the calculating of the CCA threshold comprises determining an inter-intra extended service set (ESS) status of the on-going transmission, wherein a first CCA threshold corresponding to the inter-ESS status is lower than a second CCA threshold corresponding to the intra-ESS status;
comparing the received signal strength indication with the CCA threshold for the spatial reuse transmission for assessing availability of transmission medium for spatial reuse; and
performing, upon determining that the transmission medium is available for spatial reuse based on the CCA threshold, an enhanced distributed channel access (EDCA) transmission over the on-going transmission using the calculated target transmission power within a spatial reuse duration.

8. The non-transitory computer program product of claim 7, wherein the assessing availability of the transmission medium includes reading a flag in a received message.

9. The non-transitory computer program product of claim 7, wherein the method also includes:
counting down a backoff timer for spatial reuse transmission based on the CCA threshold for the spatial reuse transmission.

* * * * *